United States Patent
Hughes, Jr.

(10) Patent No.: US 11,909,621 B2
(45) Date of Patent: Feb. 20, 2024

(54) SYSTEMS AND METHODS FOR IMPLEMENTING A NETWORK RESILIENCY TESTBED EMULATOR

(71) Applicant: LinQuest Corporation, Herndon, VA (US)

(72) Inventor: Robert Arthur Hughes, Jr., Bayfield, CO (US)

(73) Assignee: LinQuest Corporation, Herndon, VA (US)

( * ) Notice: Subject to any disclaimer, the term of this patent is extended or adjusted under 35 U.S.C. 154(b) by 0 days.

(21) Appl. No.: 18/328,277

(22) Filed: Jun. 2, 2023

(65) Prior Publication Data

US 2023/0396528 A1 Dec. 7, 2023

Related U.S. Application Data

(60) Provisional application No. 63/348,968, filed on Jun. 3, 2022.

(51) Int. Cl.
*H04L 43/55* (2022.01)
*H04L 41/14* (2022.01)

(52) U.S. Cl.
CPC ............ *H04L 43/55* (2022.05); *H04L 41/145* (2013.01)

(58) Field of Classification Search
CPC . H04T 2001/211; H04L 41/145; H04L 43/00; H04L 43/50; H04L 43/55; H04L 67/08; H04L 69/40; H04L 69/22; H04W 16/18; H04W 16/22; G06F 21/577
See application file for complete search history.

(56) References Cited

U.S. PATENT DOCUMENTS

| | | | |
|---|---|---|---|
| 6,714,549 B1* | 3/2004 | Phaltankar | H04L 45/10 370/409 |
| 8,990,061 B2* | 3/2015 | Malloy | G06F 30/20 703/22 |
| 11,424,992 B2* | 8/2022 | Grant | H04L 45/03 |
| 2005/0055195 A1* | 3/2005 | Hernandez-Mondragon | H04W 16/22 703/23 |
| 2010/0172265 A1* | 7/2010 | Wheeler | H04L 45/00 370/252 |

(Continued)

FOREIGN PATENT DOCUMENTS

| CN | 1665205 B | * | 9/2010 | ......... H04L 41/0631 |
|---|---|---|---|---|
| CN | 102148716 A | * | 8/2011 | |

(Continued)

*Primary Examiner* — Shean Tokuta
(74) *Attorney, Agent, or Firm* — MORRISON & FOERSTER LLP

(57) ABSTRACT

A method for network resiliency testing comprising: executing a resiliency testbed application at a plurality of virtual machines; accessing, by the plurality of virtual machines, network configuration data stored in a configuration database, the configuration data corresponding to a topology of a network to be emulated; configuring at least a portion of the virtual machines, according to the network configuration data, to emulate a plurality of nodes of the network to be emulated; automatically determining least cost paths between the plurality of nodes; simulating communications between the plurality of nodes based on the determined least cost paths; and determining one or more metrics of the network to be emulated based on the simulation.

27 Claims, 22 Drawing Sheets

(56) References Cited

U.S. PATENT DOCUMENTS

| | | | | |
|---|---|---|---|---|
| 2011/0075568 | A1* | 3/2011 | Omar | H04L 43/10 370/242 |
| 2014/0047079 | A1* | 2/2014 | Breternitz | G06F 9/5072 709/220 |
| 2014/0047341 | A1* | 2/2014 | Breternitz | G06F 16/23 715/735 |
| 2014/0337674 | A1* | 11/2014 | Ivancic | H04L 41/342 714/43 |
| 2015/0051872 | A1* | 2/2015 | Arora | G06F 11/3428 702/186 |
| 2017/0242784 | A1* | 8/2017 | Heorhiadi | G06F 11/3684 |
| 2018/0039567 | A1* | 2/2018 | Rajagopalan | G06F 11/3672 |
| 2018/0212859 | A1* | 7/2018 | Li | H04L 43/50 |
| 2019/0173764 | A1* | 6/2019 | Di Martino | H04L 41/122 |
| 2022/0245513 | A1* | 8/2022 | Wang | H04L 67/568 |
| 2022/0408284 | A1* | 12/2022 | Soulhi | H04W 24/02 |
| 2023/0083724 | A1* | 3/2023 | Cella | G16Y 30/00 705/28 |
| 2023/0164049 | A1* | 5/2023 | Samadi | H04L 43/0882 370/335 |
| 2023/0171614 | A1* | 6/2023 | Huang | G06N 3/084 370/252 |
| 2023/0216744 | A1* | 7/2023 | Roscoe | H04L 41/40 709/224 |

FOREIGN PATENT DOCUMENTS

| | | | | |
|---|---|---|---|---|
| CN | 107810619 | A * | 3/2018 | H04L 41/145 |
| CN | 107810619 | B * | 8/2021 | H04L 41/145 |
| CN | 115618532 | A * | 1/2023 | |
| EP | 4030728 | A1 * | 7/2022 | H04L 41/0654 |
| WO | WO-2014025584 | A1 * | 2/2014 | G06F 11/26 |
| WO | WO-2016089435 | A1 * | 6/2016 | H04L 12/42 |

\* cited by examiner

SYSTEMS AND METHODS FOR IMPLEMENTING A NETWORK RESILIENCY TESTBED EMULATOR

CROSS-REFERENCE TO RELATED APPLICATIONS

This application claims the benefit of U.S. Provisional Application No. 63/348,968, filed Jun. 3, 2022, the entire contents of which is incorporated herein by reference.

FIELD

This disclosure generally relates to network communications, and more particularly, to network communications simulations for assessing network resiliency.

BACKGROUND

Commercial and/or governmental communications networks are generally complex communications systems that include many nodes and many connections between nodes. These networks typically include redundancies that enable multiple communications paths between at least some of the nodes. These redundancies provide the networks with at least some resiliency so that communications can continue in the event of node and/or link failures. Resiliency can be enhanced through appropriate operational optimizations. However, the ability to test the resiliency of networks or to test particular operational optimizations can be difficult.

SUMMARY

According to various embodiments, systems and methods provide a communication network resiliency testbed emulator that can be used to simulate complex communications networks and evaluate resiliency algorithms for possible deployment on such networks. The emulator may leverage a cluster of multipole virtual machines executing a distributed network processing model where the network topology is implicit in the socket connectivity of the transmit/receive communication links. The emulator can use swarm theory techniques to flood the topology with propagated data structures to analyze least cost paths from all nodes to nodes.

According to an aspect, a method for network resiliency testing includes executing a resiliency testbed application at a plurality of virtual machines; accessing, by the plurality of virtual machines, network configuration data stored in a configuration database, the configuration data corresponding to a topology of a network to be emulated; configuring at least a portion of the virtual machines, according to the network configuration data, to emulate a plurality of nodes of the network to be emulated; automatically determining least cost paths between the plurality of nodes; simulating communications between the plurality of nodes based on the determined least cost paths; and determining one or more metrics of the network to be emulated based on the simulation.

Optionally, each node instantiates communications links to one or more other nodes for communicating information to the one or more other nodes. Optionally, at least one of the nodes instantiates a path component for communicating to other path components of other nodes to analyze the least cost path across nodes.

Automatically determining least cost paths between the plurality of nodes may include using swarm theory techniques to flood the emulated plurality of nodes with propagated data structures to analyze least cost paths from all nodes to all nodes.

The nodes may be configured to calculate a vector position for a visual layout and broadcast the vector position to other nodes so that the network topology can be visually displayed to a user.

Each virtual machine may emulate a plurality of nodes. The method may include emulating at least 20,000 nodes.

Automatically determining least cost paths between the plurality of nodes may include automatically discovering shortest paths between nodes by transmitting path analysis payloads between nodes.

The payloads may include a source node identification, a target node identification, and a list of nodes visited by the payload.

The list of nodes visited by the payload may be updated by at least one of the nodes receiving the payload.

Automatically determining least cost paths between the plurality of nodes may include, at a respective node, determining that the target node identification identifies the respective node, updating the target node identification with the source node identification and send the payload back to the source node.

Automatically determining least cost paths between the plurality of nodes may include, at the source node, determining that the source identification and the target identification identifies the source node, and determining whether a path traversed by the payload is a shortest path between the source node and the target node.

The method may include displaying at least a portion of the metrics via a user interface to a user.

A computing system comprising one or more processors, memory, and one or more programs stored in the memory for execution by the one or more processors for causing the system to perform any of the methods above.

A non-transitory computer readable medium comprising instructions for execution by one or more processors of a computing system that when executing by the computing system cause the computing system to perform any of the methods above.

BRIEF DESCRIPTION OF THE FIGURES

The invention will now be described, by way of example only, with reference to the accompanying drawings, in which.

DETAILED DESCRIPTION

Figure 1A:
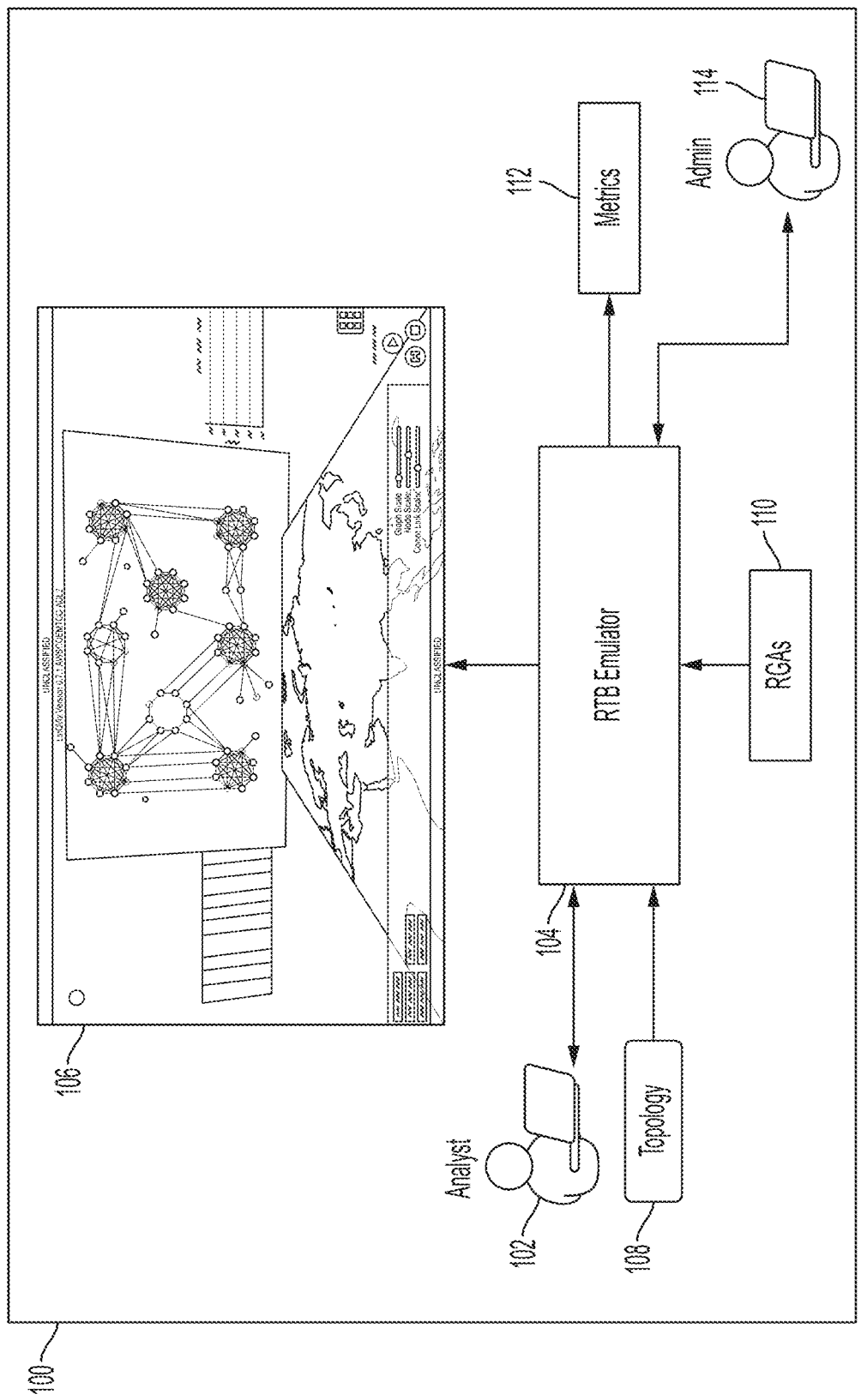
FIG. 1A is a high-level overview of the operation of an exemplary network topology emulation and analysis system for network resiliency testing.

Described herein are network topology emulation and analysis systems and methods for emulating very large networks, such as up to 20K nodes and up to 200K edges (communication links), using a cluster of virtual machines (VM) executing socket traffic, path propagation, and reporting metrics. The systems and methods may be used to simulate communication across an emulated network to validate network resiliency algorithm candidates against very large networks. The systems and methods may leverage multiple VMs, e.g., a 200 VM cluster, that may execute a distributed network processing model where the network topology is implicit in the socket connectivity of the transmit/receive communication links. The systems and methods may use swarm theory techniques to flood a topology with propagated data structures to analyze least cost paths from all nodes to all nodes. The systems and methods may execute the Fructerman Riengold Force Directed Graph algorithm in a distributed fashion to perform either a 2D or 3D network layout visualization.

The network topology emulation and analysis systems (referred to below as a Resiliency Testbed ("RTB") Emulator) may be implemented as a combination of hardware and software components. The hardware may include a number of virtual machines executing on servers, such as cloud servers or local network servers. These VMs may all run identical software in a distributed fashion, which may be loaded from a system database. The RTB Emulator may implement a user interface (UI) that can execute on a user's computing device.

According to various embodiments, two types of architectures may be implemented on the RTB Emulator: a Model View Controller (MVC) architecture, and a High Performance Computing (HPC) distributed architecture.

The MVC may be configured to create data models from data in an RTB Emulator database through an Object Relational Model (ORM) designed as a collection of Data Access Objects (DAOs). These may create services that communicate Create, Read, Update, and Delete (CRUD) operations against the database.

The HPC distributed architecture may replicate clones of a software application to each of the VMs. Then, through synchronization data in the database, all connect to the database, retrieve their specific configuration, and begin executing their state machines. The HPC processing can be deterministic with each VM executing a single software application, that in turn instantiates children processes and threads that run state machines individually. In this way, the HPC is always in a known state, with known latencies, capacity thresholds, and performance.

Reference will now be made in detail to implementations and embodiments of various aspects and variations of systems and methods described herein. Although several exemplary variations of the systems and methods are described herein, other variations of the systems and methods may include aspects of the systems and methods described herein combined in any suitable manner having combinations of all or some of the aspects described.

In the following description, it is to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Certain aspects of the present disclosure include process steps and instructions described herein in the form of an algorithm. It should be noted that the process steps and instructions of the present disclosure could be embodied in software, firmware, or hardware and, when embodied in software, could be downloaded to reside on and be operated from different platforms used by a variety of operating systems. Unless specifically stated otherwise as apparent from the following discussion, it is appreciated that, throughout the description, discussions utilizing terms such as "processing," "computing," "calculating," "determining," "displaying," "generating" or the like, refer to the action and processes of a computer system, or similar electronic computing device, that manipulates and transforms data represented as physical (electronic) quantities within the computer system memories or registers or other such information storage, transmission, or display devices.

The present disclosure in some embodiments also relates to a device for performing the operations herein. This device may be specially constructed for the required purposes, or it may comprise a general-purpose computer selectively activated or reconfigured by a computer program stored in the computer. Such a computer program may be stored in a non-transitory, computer readable storage medium, such as, but not limited to, any type of disk, including floppy disks, USB flash drives, external hard drives, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability. Suitable processors include central processing units (CPUs), graphical processing units (GPUs), field programmable gate arrays (FPGAs), and ASICs.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein.

FIG. 1A is a high-level overview of the operation of an exemplary network topology emulation and analysis system 100 for network resiliency testing. An analyst 102 may interface to a resiliency testbed (RTB) emulator 104 via a workstation or other computing system. The analyst 102 may operate the user interface 106 and perform multiple functions such as create new test bed configurations with imported topologies, execute topology analysis, and visualize the results. An analyst 102 may take a topology from a topology database 108, which may be a topology created in some other external application, and import it into the RTB Emulator 104 and create a new test bed configuration. The analyst 102 may load one or more resiliency algorithms from a resiliency algorithm database 110 for testing a network. The analyst 102 may execute analysis (e.g., simulations) against the testbed under test and gather metrics from the analysis into a metrics database 112. External systems can then connect to the metrics tables within the metrics database 112 and pull the metrics as required. An administrator 114 may control the starting, stopping, and low-level provisioning of the VMs.

Figure 1B:
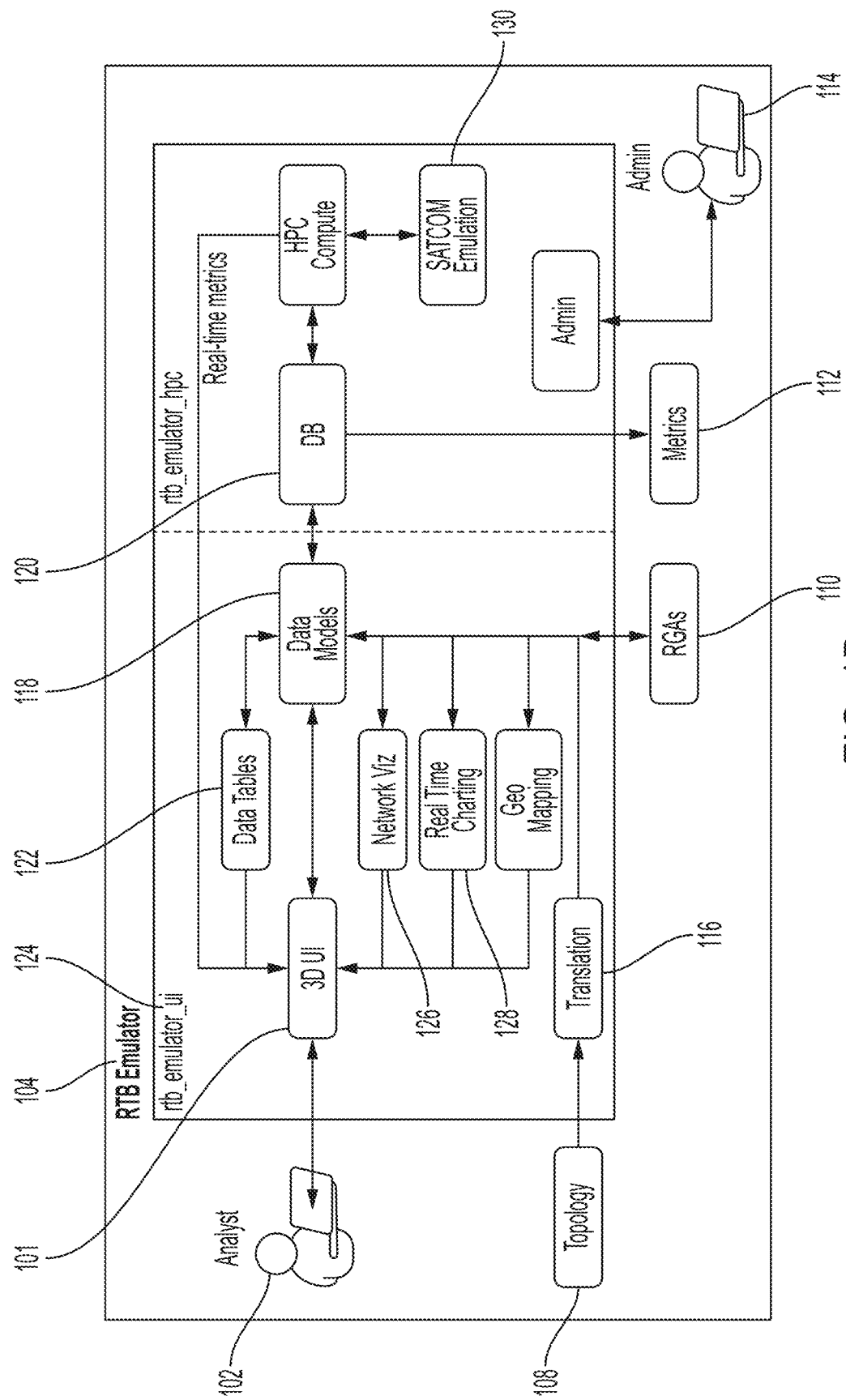
FIG. 1B is a functional block diagram of exemplary services that may be provided by the system of FIG. 1A.

FIG. 1B is a functional block diagram of exemplary services that may be provided by system 100. The analyst 102 may first access a UI application 101 (e.g., locally installed or web service based) for the RTB Emulator 104. The analyst 102 may use the UI application to create a new test bed configuration, such by importing a topology file from the topology database 108. The imported topology file can be translated via a translation module 116 to conform to internal data models 118 of the topology comprised of nodes, edges (communication links), and/or other data constructs. When a new test bed configuration is saved, the transformed data contained within the data models 118 can be written to tables in a database 120.

The analyst 102 can view the detailed data for the nodes and the cluster within a data tables service 122 in the RTB emulator UI 124. The analysts can also view the topology layout through the network visualization service 126.

The analyst 102 can change the state of the VM cluster and command it to initialize. Upon this command, the VMs of the cluster may each pull their specific configuration from the database 120 and initialize all their processes for the desired analysis. Once all of the VMs have initialized, they may move to the ready state. This can be for synchronization between VMs that may initialize at different time dues to process loading. Once all the VMs are in the ready state, the cluster can then be moved to the run state. This is where the analysis is performed and the results are either stored back into the database 120 or made available through, for example, a web socket connection for each VM, as labeled real-time charting 128. The real-time charting 128 can be designed for high speed, high volume metrics, such as at data volumes and/or rates that would overwhelm the database 120.

According to various embodiments, each VM only has one database connection. Having the web socket connection can provide an on-demand service to retrieve the metrics where and when they are needed. If it is desired to pull and aggregate all these metrics, then the cluster can move to the idle state, and each VM can be accessed in sequence to build the aggregation. The administrator 114 may be able to access the root level of the VMs for debugging, tuning, maintenance, upgrades, etc.

According to various embodiments, a SATCOM Emulator 130 can be included to provide a hardware-in-the-loop (HWIL) capability comprised of satellite modems and a satellite emulation system that can be transparently inserted into the topology for real-time emulation of satellite impairments and their effects on the topology under test.

RTB Emulator UI

The RTB Emulator user interface (UI) 124 may allow the analyst 102 to manipulate the data and functions of the emulation system against a test network topology. The RTB Emulator UI 124, when executed, may listen on web sockets and its message queue, waiting to receive messages. When the messages are received, the RTB Emulator UI 124 may animate 3D objects and provide the visualization. The RTB Emulator UI 124 may immerse the analyst within the data analytics by using secured 3D technology at the presentation layer that supports the advanced collaboration and analytic fusion necessary to leverage cloud technology. The user operation of RTB Emulator UI 124 may be similar to that of 3D video games that use a keyboard and mouse. The analyst 102 can be represented as an "Avatar" in 3D virtual space that will look and move as commanded by the user.

The RTB Emulator UI 124 may be configured to enable the analyst 102 to do a variety of functions including: external import of graph topologies, manage testbed configurations, manage visual display of topology before test, manage running simulations and other analysis, and manage visualization of the results. The analyst 102 may add their own files using the emulator's import functionality, which may allow them to: view a data table of the topology nodes, view a live data table of the data nodes, view a data table of cluster status, view the cluster status data such as state, IP address, last timestamp, etc., view the layout of the topology in 2D or 3D, view the network layout as force directed graph processed by either the external program or the layout analysis, view the strip chart of the aggregated throughput metrics in real-time, and/or view running strip chart of the aggregated tx/rx bytes/sec metrics over time.

According to various embodiments, the system 100 can take in files with specific parameters and convert them into 2D and 3D force directed graphs for a more interactive viewing of network topology.

The RTB Emulator UI 124 may be configured to enable the analyst 102 to view a table of existing test bed configurations, access a data view of the library of existing test bed configurations showing basic information, select an existing test bed configuration, select a test bed configuration from the data view of the test bed library and bring it up in the view with its meta data, create new test bed configurations, access data entry screen to enter metadata about the new test bed, modify a test bed configuration, update an existing test bed configuration's metadata such as name or description, delete a test bed configuration, adjust the network topology node size, graph size, and/or commlink size in order to accurately display the information in the force directed graph, view the layout of the topology in 2D or 3D, view the network layout as a force directed graph processed by either the external program or the layout analysis, view the shortest path between two nodes, display on-demand shortest path routing between a source node and a target node during, or after, the path analysis, display (e.g. over 100k) communication links in real time for the force directed graph display, run simulations against the network for analysis, view the strip chart of the aggregated throughput metrics in real-time, view running strip chart of the aggregated tx/rx bytes/sec metrics over time, and/or start and stop a simple red attack.

The RTB Emulator UI 124 may be based on an MVC architectural pattern, which embodies three parts: model, view and controller, or to be more exact it divides the application into three logical parts: the model part, the view and the controller.

The model part may be responsible for maintaining data. The model is connected to the database so anything you do with data such as adding or retrieving is done in the model component. It responds to the controller requests because the controller never talks to the database itself. The model talks to the database back and forth and then it gives the needed data to the controller.

The view part represents data. It generates UI or user interface for the user. Views are created by the data which is collected by the model component, but these data may not be taken directly but through the controller, so the view may only speak to the controller.

The controller can enable the interconnection between the views and the model so it acts as an intermediary. The controller does not need to worry about handling data logic, it just tells the model what to do. After receiving data from the model, it processes it and then it takes all that information it sends it to the view and explains how to represent to the user.

The RTB Emulator UI 124 may operate and test a network topology that is represented in a predetermined file format, such as a JSON file format. When a user creates a new testbed configuration, they may import a topology (and may add metadata to the record such as name and description).

The system 100 may take the network topology file and, using the testbed configuration, map a 3D topology. The system can render the network topology as a force directed graph (FDG), which may comprise 1000s of nodes and have red attacks run against them.

According to various embodiments, a particle effect system designed for simulating moving liquids, smoke, clouds, flames, etc., can be used in the creation of the FDG due to its ability to create the communication links in the FDG in large quantity without slowing down the scene. The particle effect system may be implemented in GPU code that executes within GPU cores and may execute thousands of processes in parallel without affecting any CPU processing.

According to various embodiments, the system 100 can select between two nodes (e.g., Node A and Node B) and assess the lowest cost to traverse from Node A to Node B. As the RTB emulator 104 is processing the path analysis, each VM can be gathering the lowest cost paths of at least a portion of its respective nodes. This can be available through a dedicated web socket service on each VM. The analyst 102 can select a source and target node on the network layout, and the RTB Emulator UI 124 may determine which VM web socket has that node's path information, access it, and then display the path.

According to various embodiments, the analyst 102 may run red attacks on the FDG, which may simulate an attack on the network by randomly selecting nodes to jam. In response, the graphical appearance of jammed nodes may change, such as changing in color (e.g., to red). When the system 100 is used to execute a resiliency algorithm with simulated attacks, the graphical appearance of nodes-under-attack may change according to the algorithm logic. An example of this is illustrated in the exemplary UI 300 of FIG. 3 in which the graphical appearance of attacked nodes 302 is different than that of non-attacked nodes 304.

The RTB Emulator UI 124 can be configured to give the analyst 102 the most important data from the FDG models and simulations efficiently. There are a variety of metrics that an analyst 102 may desire to access at a given time. One example is path analysis. Once the system has been configured and an FDG has been rendered, all the comm links between the thousands of network nodes may have a least cost to travel. The analyst 102 may select between two nodes and determine the cost to travel from one node to another and record those metrics. Another metric is aggregate throughput analysis. The system 100 can analyze the data and can records the aggregated network throughput in real time. The analyst 102 may run different red attacks against the network and record the results and export them in order to compare them with previously run simulations. Another metric is layout analysis. The system may look at all metrics associated with its network layout and display them for the analyst. This may be important as the network increases in scale by being able to accurately handle the large scale of data being rendered in a 3D space efficiently and quickly without crashing the system.

HPC for the Resiliency Test Bed Emulator

The RTB Emulator 104 may be a large High-Performance Computing (HPC) platform that executes a network topology test bed that emulates real traffic flow between nodes, which can include satellite backhauls, and performs distributed analysis such as lowest cost paths between all nodes, aggregated packet throughputs, and force directed graph layouts.

The real-world is a very fractured, disconnected, dirty, and fragmented environment that is difficult to model in a simulation. The RTB Emulator 104 is configured to more closely represent real-world validations than conventional systems, which can increase the certainty of successfully applying resiliency algorithms or other network optimizations into real networks. According to various embodiments, the RTB Emulator 104 can apply repeatable real-world impairments, latencies, and scaling problems to topologies under test, and empirically determine the value that each resiliency algorithm approach can bring to resiliency within a controlled laboratory environment.

According to various embodiments, the RTB Emulator 104 can integrate other large simulations or emulations such as cyber defense systems, 5G massive edge computing, digital engineering modeling that can all benefit from a real-world resiliency emulation.

According to various embodiments, the RTB Emulator 104 can be configured to provide one or more of the following: self-configure for user-defined topologies up to, e.g., 20,000 nodes; self-configure for user-defined analyses such as least cost path, edge betweenness centrality, FDG layout, and aggregated throughput; execute configured analysis for local scope only (no global scope); self-configure for user-defined resiliency algorithms; execute configured resiliency algorithms; auto-registration of cluster resources; auto-provisioning of compute resources based upon topology configuration; user controlled execution of internal states that support idle, init, ready, register, run, stop, and error; aggregation of analyses metrics; support for real-time metrics data feeds by users; process a single topology at a time.

Resiliency optimization algorithms that may be tested via the system 100 (which may implement, for example, deep learning and/or reinforcement learning approaches), may have $O(n^2)$ operations. When considering pair-wise path analysis of all nodes, the complexity can approach $O(n^3)$. That is why many resiliency theories address only very small topologies (<100) which can be easily simulated on a single workstation. However, in the real-world, topologies can easily exceed 1000s of nodes and that is where the compute scaling issues occur in conventional solutions. In contrast, the system 100 is configured to handle these topologies and resiliency algorithms.

The RTB Emulator 104 may be configured to only use local scope, where any node only has knowledge of its neighbors, the compute is very small but distributed and replicated 1000s of times across a cluster of compute resources, and no one node has the entire topology identified. This may be preferable over a system design that supports global scope for very large networks, since such a system would run into compute barriers such as distributed compute memory pressure, over-stressing a centralized data store, exceeding stack depth, and security barriers such as the identification of the total topology within the compute systems at a lower classification level. According to various embodiments, the RTB emulator 104 may be deterministic. In contrast, a non-deterministic design, such as an event-based system, could, at very large scales, put the system into non-deterministic states such as ringing, storming, and deadlocks. Latencies in very large systems accumulate and can cause emergent issues. With its deterministic design, the RTB emulator 104 can avoid these issues.

Figure 2:
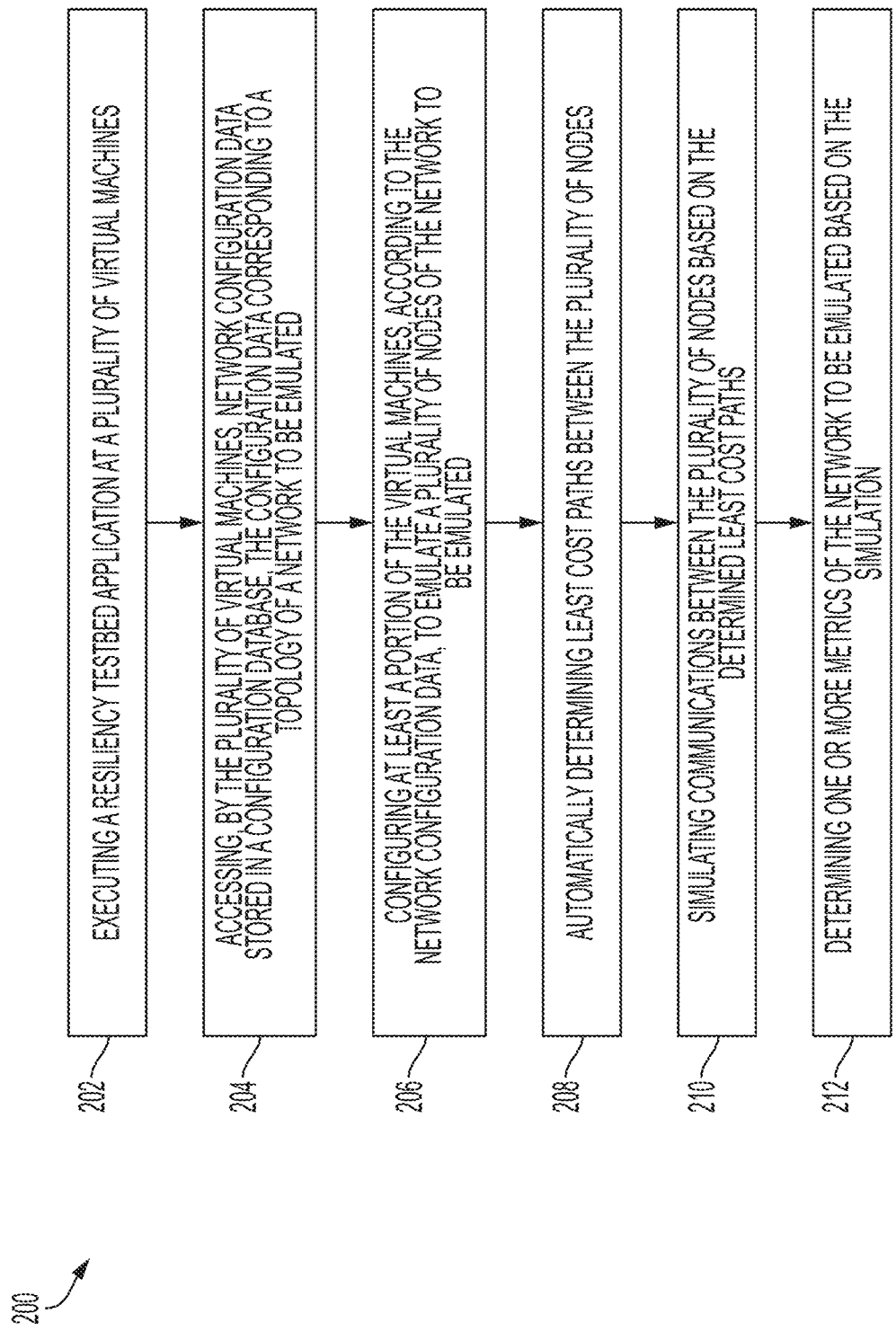
FIG. 2 is a flow diagram of an exemplary method for network resiliency testing.

FIG. 2 is a flow diagram of an exemplary method 200 for network resiliency testing. Method 200 can be performed by, for example, by RTB emulator 104 using a plurality of virtual machines. Method 200 can be used to emulate large networks, such as up to 20K nodes and up to 200K communication links, using a cluster of virtual machines (VM) executing socket traffic, path propagation, and reporting metrics. Method 200 may be used to simulate communication across an emulated network to validate network resiliency algorithm candidates against very large networks. The systems and methods may leverage multiple virtual machines that may execute a distributed network processing model where the network topology is implicit in the socket connectivity of the transmit/receive communication links.

At step 202, a resiliency testbed application is executed at a plurality of virtual machines. At step 204, the plurality of virtual machines access network configuration data stored in a configuration database. The configuration data corresponds to a topology of a network to be emulated. The configuration data can include information about how many nodes the network has and the interconnection of those nodes. At step 206, at least a portion of the virtual machine are configured according to the network configuration data to emulate a plurality of nodes of the network to be emulated. One or more of the virtual machines can emulate a single node or more than one node. Each node emulated by a virtual machine instantiates communications links to one or more other nodes for communicating information to the one or more other nodes. At least one of the nodes instantiates a path component for communicating to other path components of other nodes to analyze the least cost path across nodes.

Figure 3:
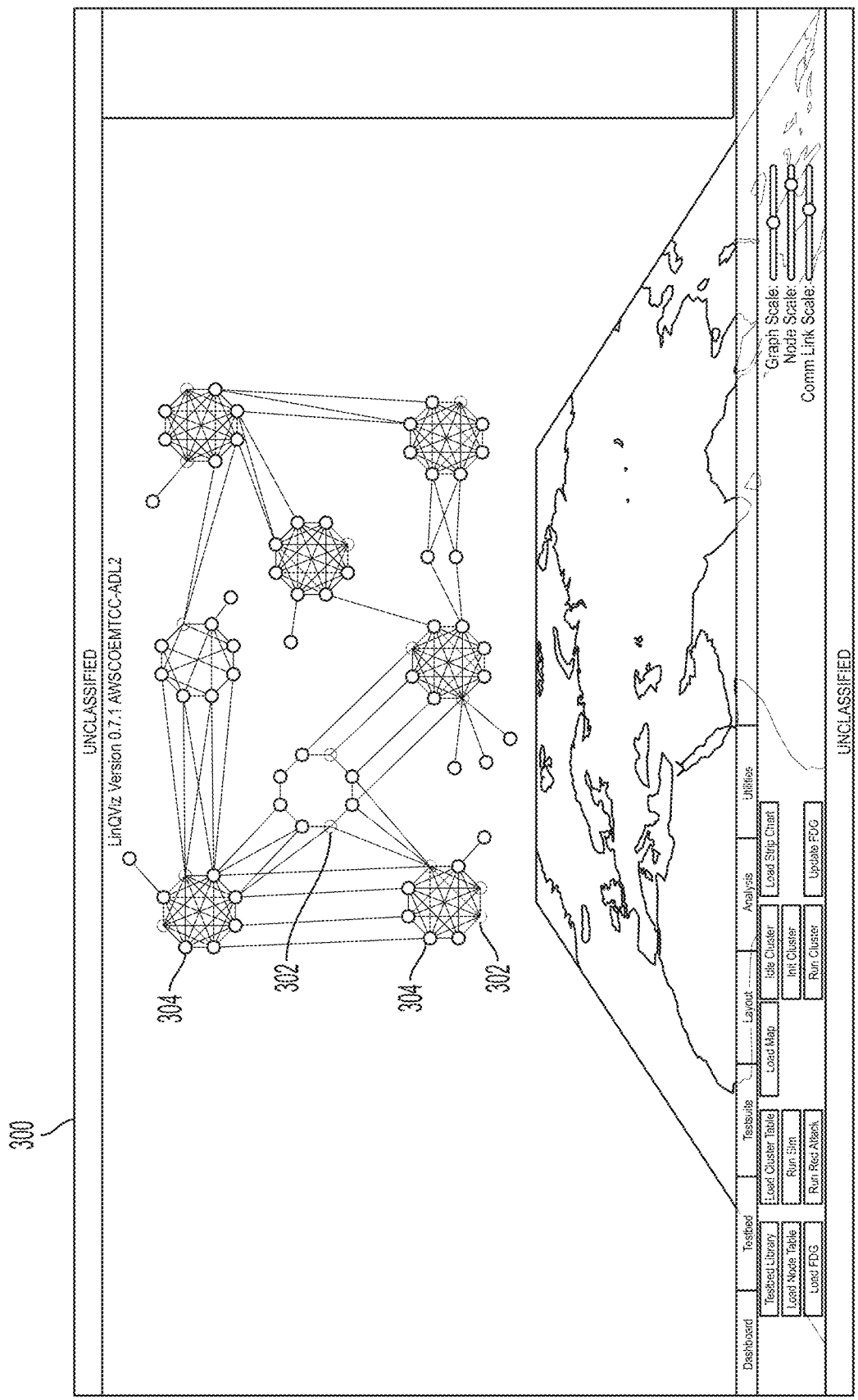
FIG. 3 is an exemplary user interface displaying a network topology, including nodes that have been attacked.

At step 208, least cost paths between the plurality of nodes are automatically determined. This can be done, for example, using a network resiliency agent implemented at one or more nodes executing a network resiliency algorithm configured to determine least cost paths for routing data across the network. Automatically determining least cost paths between the plurality of nodes can include automatically discovering shortest paths between nodes by transmitting path analysis payloads between nodes. The payloads can include a source node identification, a target node identification, and a list of nodes visited by the payload. The list of nodes visited by the payload may be updated by at least one of the nodes receiving the payload. Optionally, automatically determining least cost paths between the plurality of nodes includes, at a respective node, determining that the target node identification identifies the respective node, updating the target node identification with the source node identification and send the payload back to the source node. Optionally, automatically determining least cost paths between the plurality of nodes includes, at the source node, determining that the source identification and the target identification identifies the source node, and determining whether a path traversed by the payload is a shortest path between the source node and the target node At step 210, communications between the plurality of nodes is simulated based on the determined least cost paths. At step 212, one or more metrics of the network to be emulated are determined based on the simulation. At least a portion of the metrics may be displayed to a user via a graphical user interface (such as illustrated in FIG. 3).

RTB Emulator Architecture

The below is an overview of exemplary architecture of the RTB emulator 104.

Logical Architecture

Figure 4:
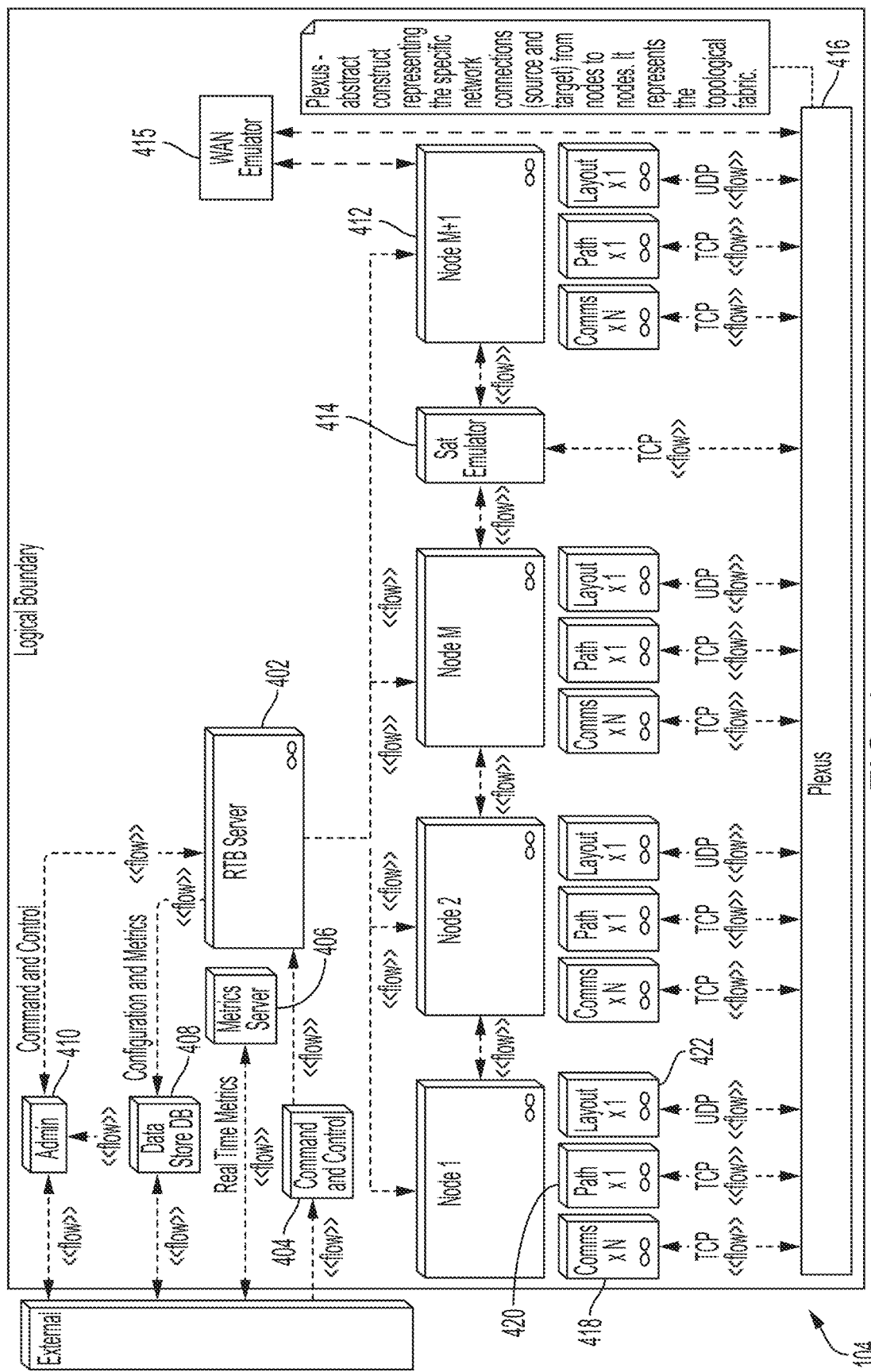
FIG. 4 illustrates a logical representation of an exemplary embodiment of a resiliency testbed emulator.

The logical architecture discussed below decomposes the use cases of an exemplary RTB emulator 102 into identifiable and logical components and sub-components. FIG. 4 illustrates a logical representation of an exemplary embodiment of the RTB emulator 104.

Communications links 418: For Aggregate Throughput analysis, each Node will instantiate N number of 'Comms' components which represent communication links. Each link will be configured for either TX or RX or both and will have the capability to transmit or receive information across an information channel that is configured to be point-to-point. For example, a communication link for one Node could communicate to a communication link on another Node, source to target, to represent a directed edge in a graph.

Path 420: A single 'Path' component would be instantiated if the RTB emulator is configured to perform the Pairwise, All Node, Least Cost Analysis. This Path component would communicate to other Path components of other Nodes to analyze the least cost path from all nodes to all nodes in a massively parallel manner. Swarm logic techniques may be used here.

Layout 422: For A Force-Directed Graph (FDG) analysis, a single 'Layout' component would be instantiated that would calculate the 2D or 3D vector position of a Node in a visual layout. All 'Layout' components would broadcast their parent Node's vector position to all the other Nodes. As current Node positions are received, the Node Layout component would re-calculate the Node's new position and re-broadcast it back out. In this manner the whole topology begins to attain equilibrium and a FDG layout emerges.

Plexus 416: As used herein, a plexus represents the totality of the network connections between all communication links between the nodes. It can be thought of as the tangled patch cords of an old phone operator's console. The plexus is defined by the graph edge data that is part of the RTB emulator configuration information.

Sat Emulator 414: This capability can emulate the impairments from a satellite link and can comprise modems and a satellite emulation hardware that can transparently interject into a communication link. This HW In the Loop (HWIL) capability can allow experimentation with resiliency mitigation on SATCOM backhauls.

WAN Emulator 415: The WAN Emulator can be a specific hardware system that can emulate the impairments from a WAN network. It can transparently interject into a communication link. This HWIL capability can allow experimentation with resiliency mitigation on Wide Area Networks.

The RTB emulator 104 includes a main parent component 'RTB Server' 402. This logical component manages the command and control 404, metrics server 406, data store 408, and administrative 410 functions interfacing to the external world. The RTB Server 402 can create nodes 412 that represent node processing for each node in a configured topology. Each node 412 can be created per the configuration data found in the data store 408. Each node 412 can be capable of performing specific compute tasks as well as managing other sub-components, as described further below.

Figure 5:
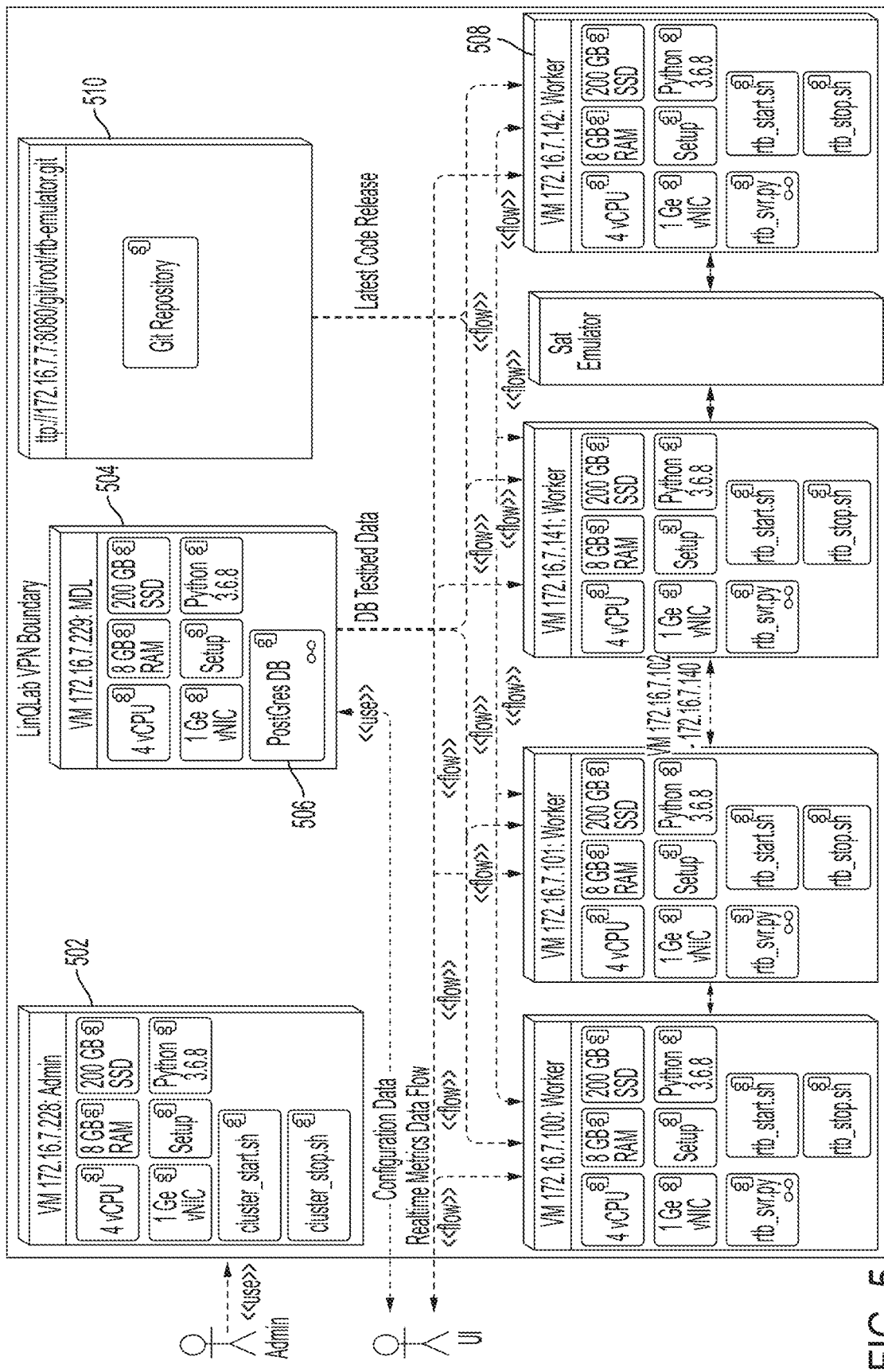
FIG. 5 illustrates how logical architecture of a resiliency testbed emulator can be overlaid upon a physical layer.

FIG. 5 illustrates how the logical architecture discussed above can be overlaid upon a physical layer, according to an example of the RTB emulator 104. This is where the distributed nature of the logical architecture can be realized to offer the opportunity to experiment with scalable approaches to applying resiliency algorithms to very large topologies within a lab environment. In the example, VMs (e.g., Centos VMs) are provisioned that include suitable processing power and memory (e.g., 4 vCPU×8 GB RAM and 200 GB of storage). In some embodiments, each VM can access 1 Ge NICs.

An Admin VM 502 can be used as the command and control node which the administrator will log into and command the rest of the cluster. On the Admin node are the cluster scripts to start, stop, and tail the workers 508.

A Metadata Data Layer (MDL) VM 504 is where a single database 506 is installed that is accessed by all the workers 508 in the cluster. The lab git repository 510 can be used for configuration management of the RTB emulator HPC code, and from which the workers 508 can pull the RTB emulator code upon startup.

The 'RTB Server' logical components are distributed/replicated to a suitable number of VMs. A single application may execute on each VM and controls all RTB emulator functions. Any suitable number of VMs can be used depending on the desired maximum size of network topologies to test. For example, with at least 100 nodes managed per VM, 200 VMs can provide at least a 20,000 node capability.

At the core of the RTB emulator 104 is the data layer (e.g., data tables 122 of FIG. 1B). The topmost parent table is called "master." The master can be a single record that represents the state of the entire data schema and relates schema version to the emulator version to the UI version. The master can identify the single testbed identifier of the testbed configuration that the cluster needs to process, as well as the single analysis for the cluster to perform.

The "testbed" table is where a parent record is established for every testbed configuration. Each testbed configuration directly represents a given topology. Stored is the total number of nodes, edges (comm links), the name, description, and the imported file used to seed the node/edges data.

From the testbed table, a table is related that represents the specific configuration data for each RTB server that is executing on every VM of the cluster. The RTB server table contains the number of nodes that the specific RTB server will manage and the index of the RTB server.

The RTB server table can now link to the node table and the communication link table. The node table has all the node data and has a composite key of the testbed identifier, the RTB server identifier, and node identifier. The nodes have a specific unique identifier as well as a running index number that is within the context of the specific RTB server.

A cluster table relates the index of the RTB server with the specific IP address of the VM executing the RTB server. Upon startup on the RTB server and entering an initialization state, the RTB server will get its local host IP from the VM and look it up in the cluster table. If found, it will find the index value in the cluster table and use it to retrieve its RTB server parent record, which combined with the testbed identifier, allows it to retrieve all of the specific nodes and comm links data destined for the RTB server.

Figure 6:
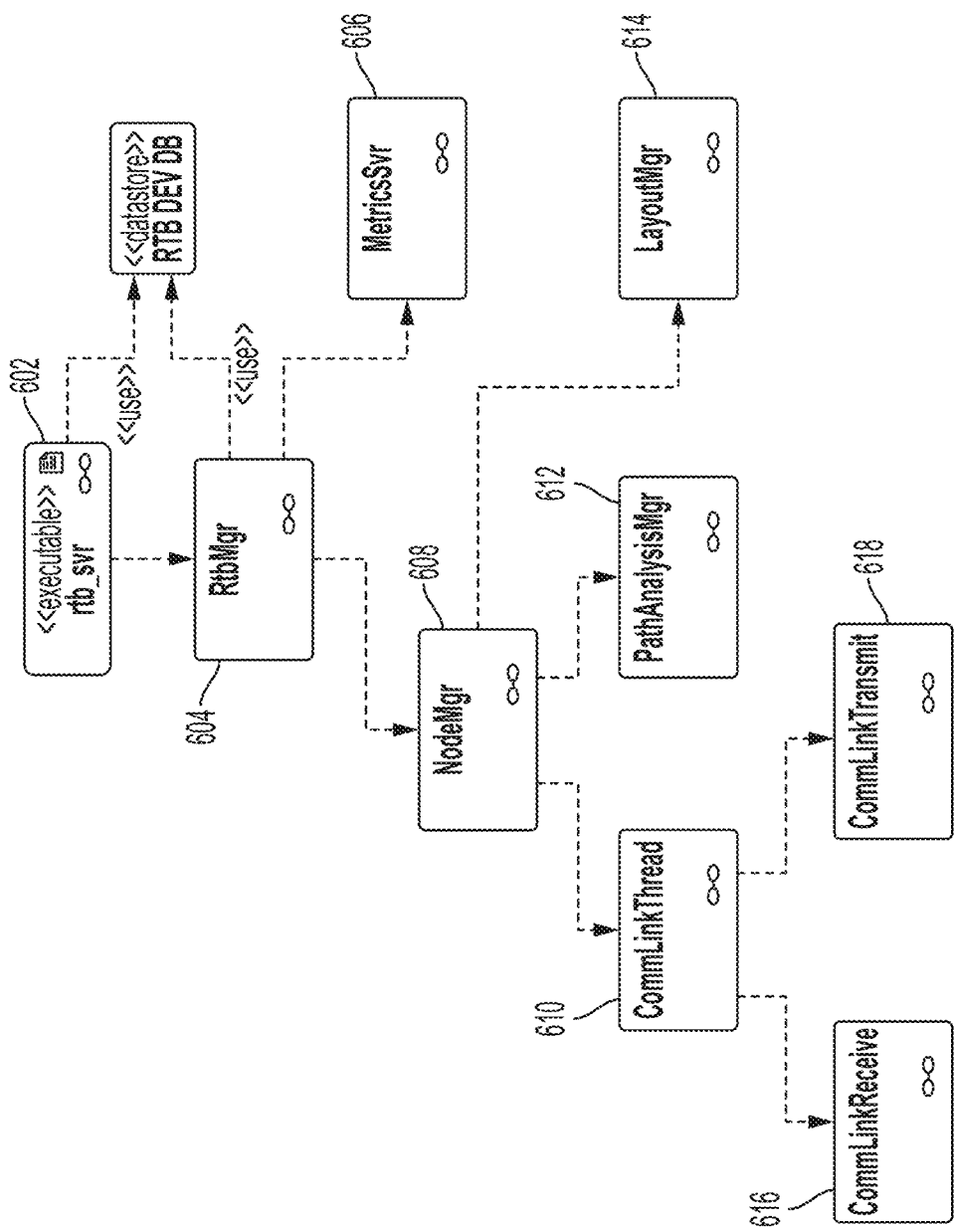
FIG. 6 shows software objects and their relationships as implemented in an example of a resiliency testbed emulator.

FIG. 6 shows software objects and their relationships as implemented in an example of the RTB emulator 104. The RTB server (rtb_svr) application 602 can execute one-per-VM in the HPC cluster. It can define the database connection string and perform basic command-line processing before instantiating a single RTB manager (RtbMgr) class process 604. This class can be the overall manager for the VM and can handle the single connection to the database. It can also handle any TCP listening and sending of data between VMs. This can reduce the amount of connections between the nodes within the VMs. The RtbMgr 604 also instantiates a single metrics server (MetricsSvr) 606, which is only responsible for providing a web socket interface for the RtbMgr 604. This web socket interface can be used to provide real-time path and layout data to the calling system, which in most cases may be the RTB emulator UI 124 (see FIG. 1B).

The RtbMgr 604 may read from the master table the testbed identifier (testbed_id) to process. It may access the testbed, RTB server, cluster, node, and communication link tables to gather all of the required configuration data and then instantiate the number of node managers (NodeMgrs) 608 it will need to manage for a specific VM. For each of these NodeMgrs 608, it may pass the communication link data that each node must manage along with the type of analysis the cluster will process.

Each NodeMgr 608 may instantiate N number of communication link threads (CommLinkThreads) 610 if the analysis is 'comms', or one path analysis manager (PathAnalysisMgr) 612 if the analysis is 'path', or one layout manager (LayOutMgr) 614 if the analysis is 'layout'. For each CommLinkThread 610 instantiated, it will either instantiate a communication link receive (CommLinkReceive) 616, a communication link transmit (CommLinkTransmit) 618, or both, depending upon the directedness of the communication link.

Figure 7:
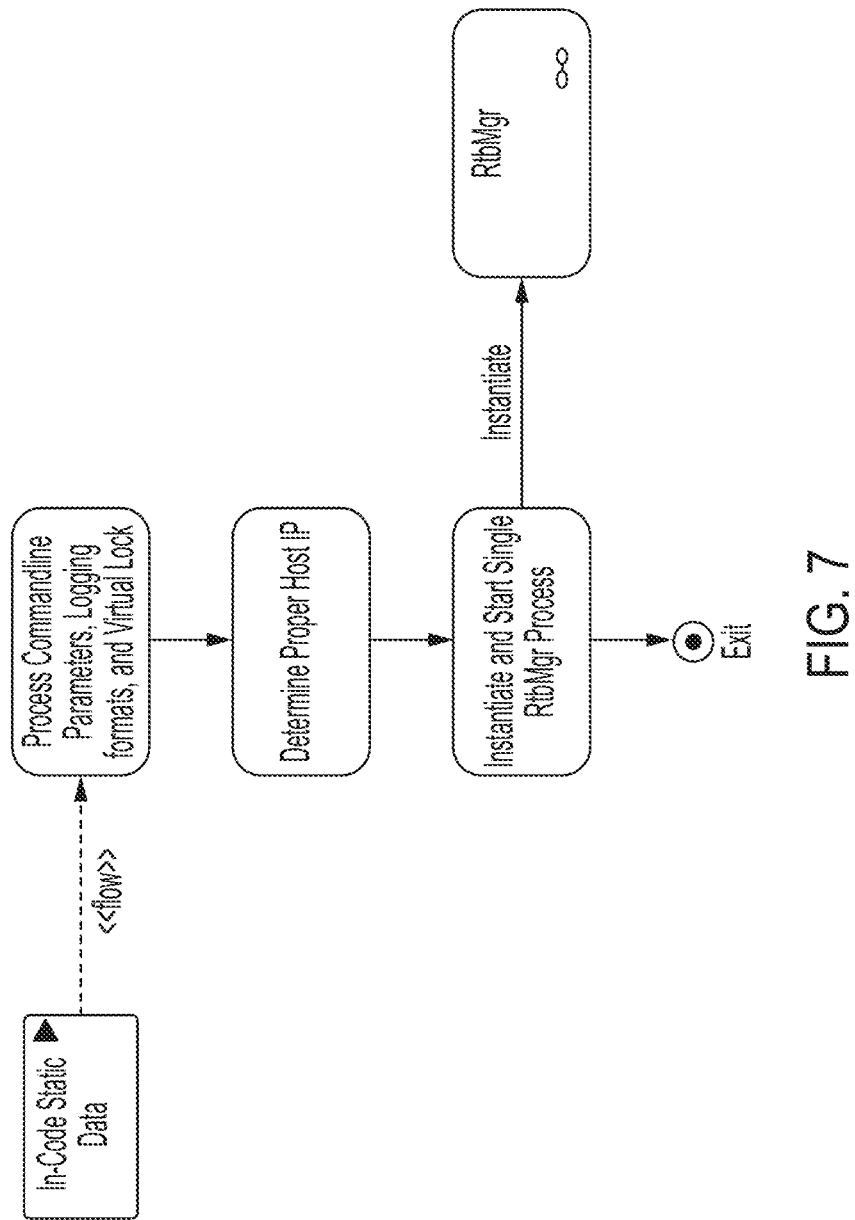
FIG. 7 is a flow diagram of an exemplary resiliency testbed server application.

FIG. 7 shows the flow of the RTB server application, according to at least some embodiments. This application may be a house-keeping shell that processes command line parameters, sets logging formats, and creates a virtual lock such that only one RTB server application can execute at a time. It may then determine the correct host IP address and start a single RtbMgr process.

Figure 8:
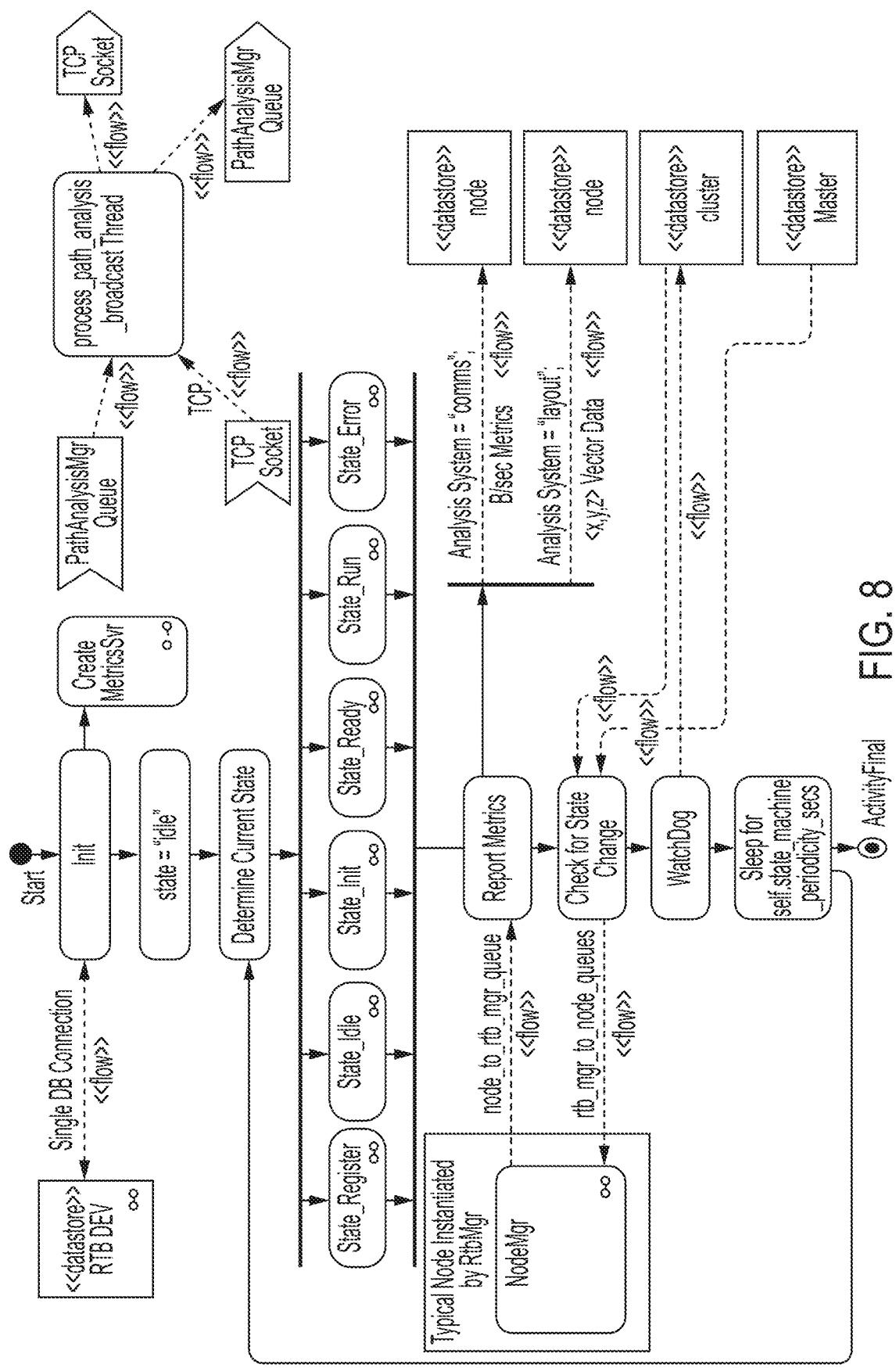
FIG. 8 is a flow diagram of an exemplary resiliency testbed manager software class.

FIG. 8 shows an exemplary flow of the RtbMgr class. This class is instantiated by the RTB server application, and there is only one RtbMgr per VM. The RtbMgr can be a simple state machine that initializes its variables and creates a MetricsSvr that may execute its internal state. The first state can be 'register' where it can access the cluster table of the database to find its host IP address. The cluster table may be preloaded with all of the IPs of the VMs. Once found, it may continue normal operations. If it is not found, it can report an error and move to the error state. Once the RtbMgr and the VM are properly registered, the RtbMgr may find its cmd_state in the cluster table and process that state. Usually this is 'idle'. When the cluster command state is moved to initialize (by the UI 124), all RtbMgrs on the cluster will assume the initialization state, read the configuration data from the database, instantiate the required number of NodeMgrs per VM, pass to these NodeMgrs their analysis/comm_link data, and then move to the 'ready' state. This allows for synchronization of all VMs and RtbMgrs before they enter the 'run' state. States within the RtbMgr are also propagated to the children CommLinkThread (CommLinkReceive, CommLinkTransmit), PathAnalysisMgr, and LayoutMgr (see FIG. 6).

Figure 9:
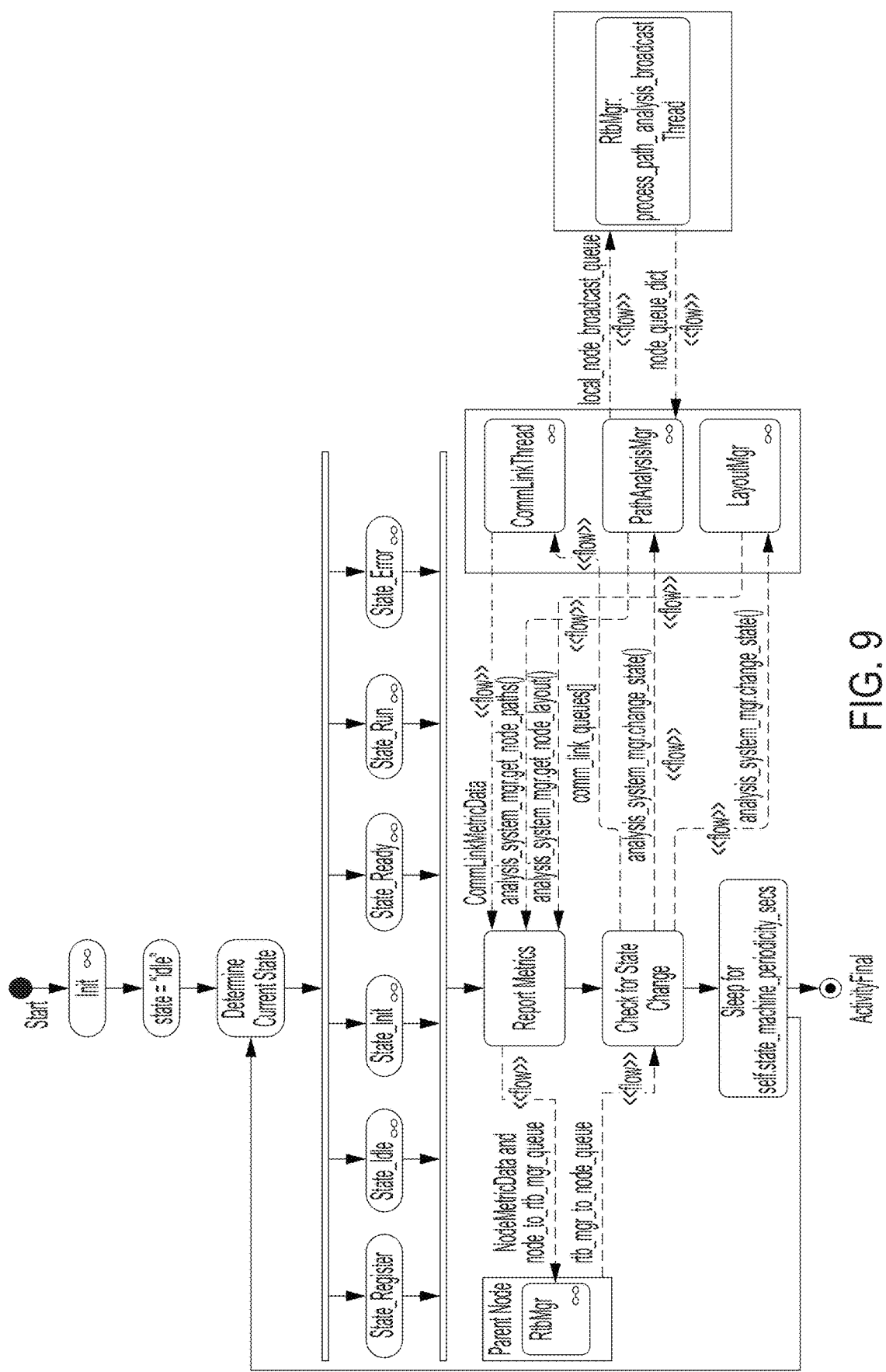
FIG. 9 is a flow diagram of an exemplary node manager software class.

FIG. 9 shows an exemplary flow of the NodeMgr class. A NodeMgr class may be instantiated for every node that a RtbMgr needs to manage. The NodeMgr is a distributed process that is capable of performing any compute process and can communicate to other nodes via point-to-point TCP socket connections, perform path analysis using swarm logic techniques, or perform distributed FDG calculations across the topology. It is again a state machine that will receive its configuration information from its parent, RtbMgr. It will then be instructed to move to the init state where it will either instantiate N number of CommLinkThreads that this specific NodeMgr must manage, or a single PathAnalysisMgr to perform the path analysis, or a single LayoutMgr that will calculate the vector position of this node in a FDG. Two-way queues are established between the NodeMgrs and the RtbMgr.

Figure 10:
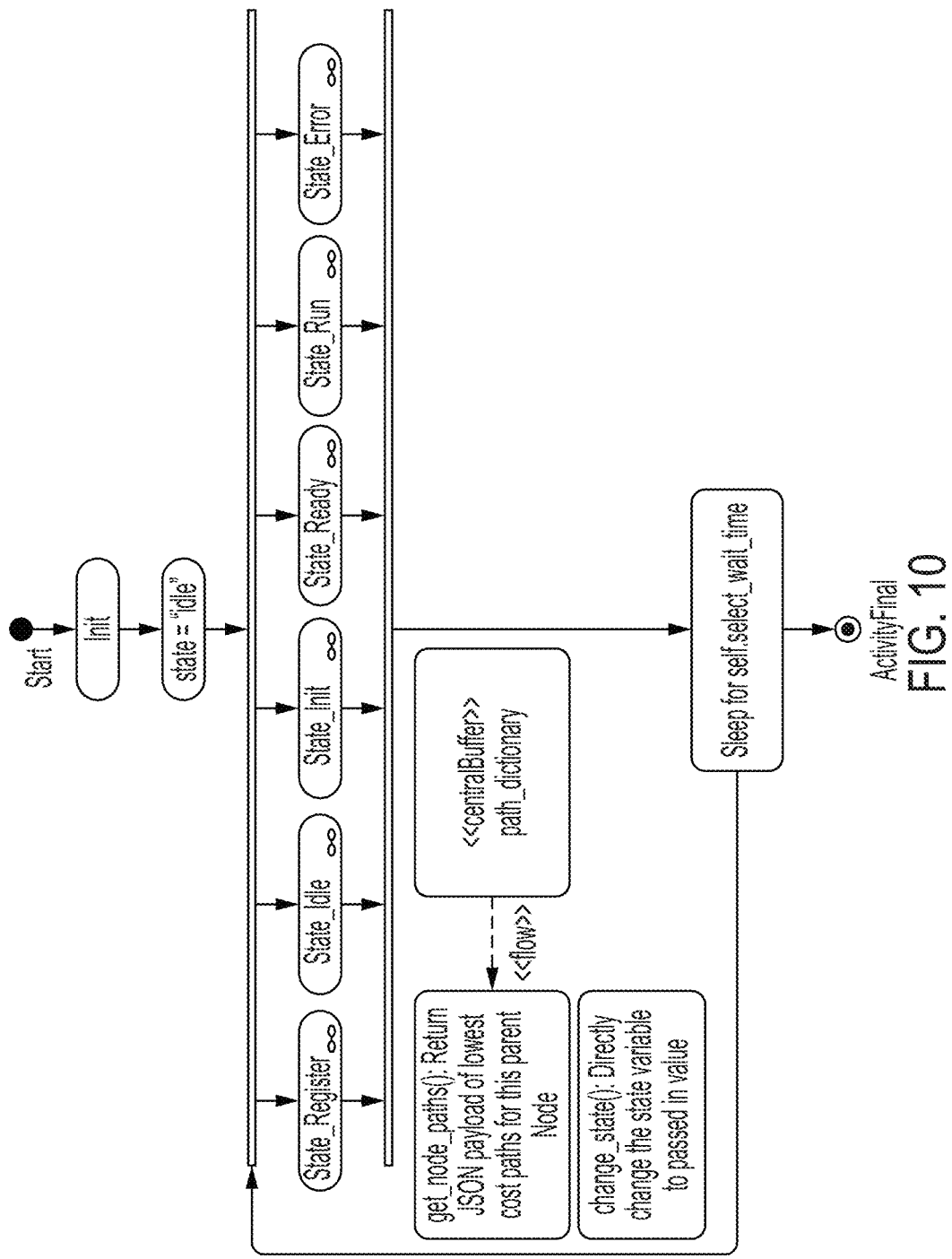
FIG. 10 is a flow diagram of an exemplary path analysis manager software class.

An example of the PathAnalysisMgr is shown in FIG. 10. If the testbed configuration calls for path analysis, then one of the PathAnalysisMgr classes may be instantiated for every NodeMgr. It is responsible for executing the swarming techniques to analyze the lowest-cost paths from all nodes to all nodes. First the RtbMgr establishes a thread to essentially create a multi-process queue system that can be broadcasted over TCP to all of the other RtbMgrs. When a local node needs to communicate with another local node, this broadcasting system keeps the communication local and data is passed from one local node's queue to the other, steered by the source_id and target_id fields of the data payload. If a local node needs to communicate with a node that is managed by another VM, then that data payload is sent to that node via TCP. Using this technique, any node can send a data payload to any other node in the topology based upon the source_id and target_id fields of the data payload. It is using this back channel approach to support red attack scenarios where nodes can be disabled within the plexus. Now the PathAnalysisMgr is again a state machine that will move from idle, to init, to ready, and then to run, all executing within a thread. State is changed via a direct call to cha nge_state( ) from the NodeMgr parent.

Figure 11:
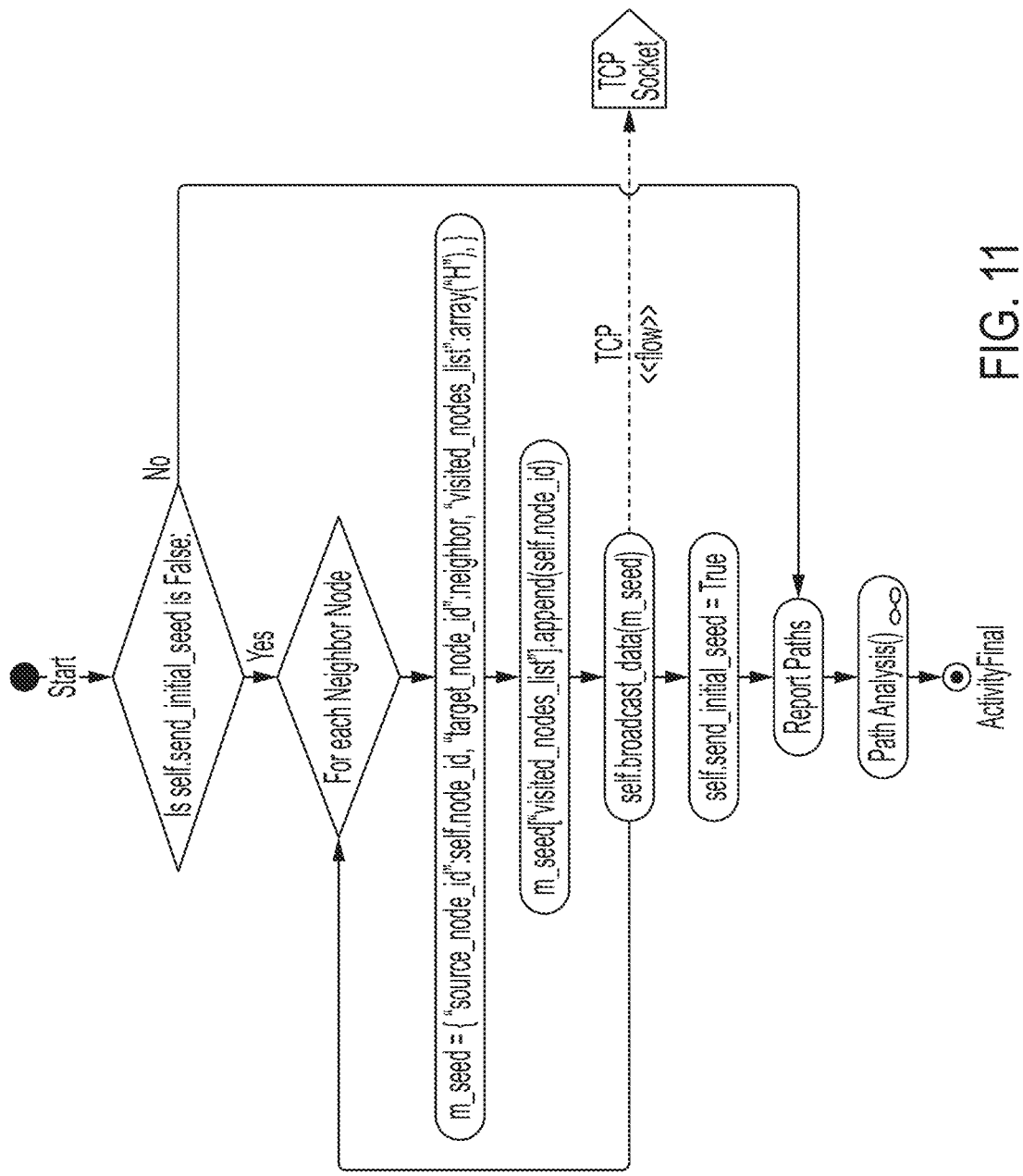
FIG. 11 is a flow diagram of an exemplary path analysis manager swarm seeding flow Diagram

The PathAnalysisMgr, once set to the run state, may be use swarm logic to determine the lowest cost paths from any nodes to any nodes simultaneously. After the broadcasted queues are established and the thread is set for 'run', the swarm processing begins by first seeding the topology. This is shown in FIG. 11. The data payload structure can be:

class PathAnalysisData: source_node_id=−1 target_node_id=−1 visited_nodes_list=array("H").

Where source_node_id=ID of the node that will be the source of the path. This is the node that originates the payload. target_node_id=ID of the neighbor node that should receive this packet. visited_nodes_list is list of nodes that are visited by the propagation of this data packet A path can be characterized in a payload by source_id–the root node of a path, the target_id–the next node to transmit this payload, and the visited_nodes_list, which is a list of node ids that have been visited by this specific data payload.

According to various embodiments, the swarm function of the RTB emulator is accomplished in 4 phases: Phase 1: Seeding. This phase will have each node create a payload based upon its own ID (source) and the ID of a neighbor (target) that it can transmit to. The node then transmits these payloads out to its neighbors. This initiates the swarm not unlike a chain reaction. Phase 2: Swarming. After seeding, the nodes begin processing incoming payloads and applying the swarm logic rules. Based upon these rules, the payloads will either be killed, or replicated, modified, and propagated to the nodes' neighbors. The amount of traffic increases exponentially. Phase 3: Convergence. As the RTB emulator swarms and nodes are reporting their lowest cost paths, the lowest-cost path solution for the entire topology begins to converge. Multi-paths that are not lowest cost are growing and are still being analyzed, but the local mins are being aggregated and registered. Phase 4: Drain. The RTB emulator is converging and paths that are not lowest-cost are being killed at an increasing rate. This effectively drains the swarm from the RTB emulator until no further payload propagations are occurring. This signals the end of the analysis.

To begin seeding for a given node, the list of neighboring nodes—nodes that we can transmit to—are used to create a new PathAnalysisData payload for each neighboring node, in which is placed the node id in source_node_id, the neighbor's node id in the target_node_id and add the node's node_id to the visited_nodes_list. Then this data payload is broadcast out to the neighbor nodes. Each PathAnalysisMgr of each NodeMgr will do this in parallel and the swarm begins.

Figure 12:
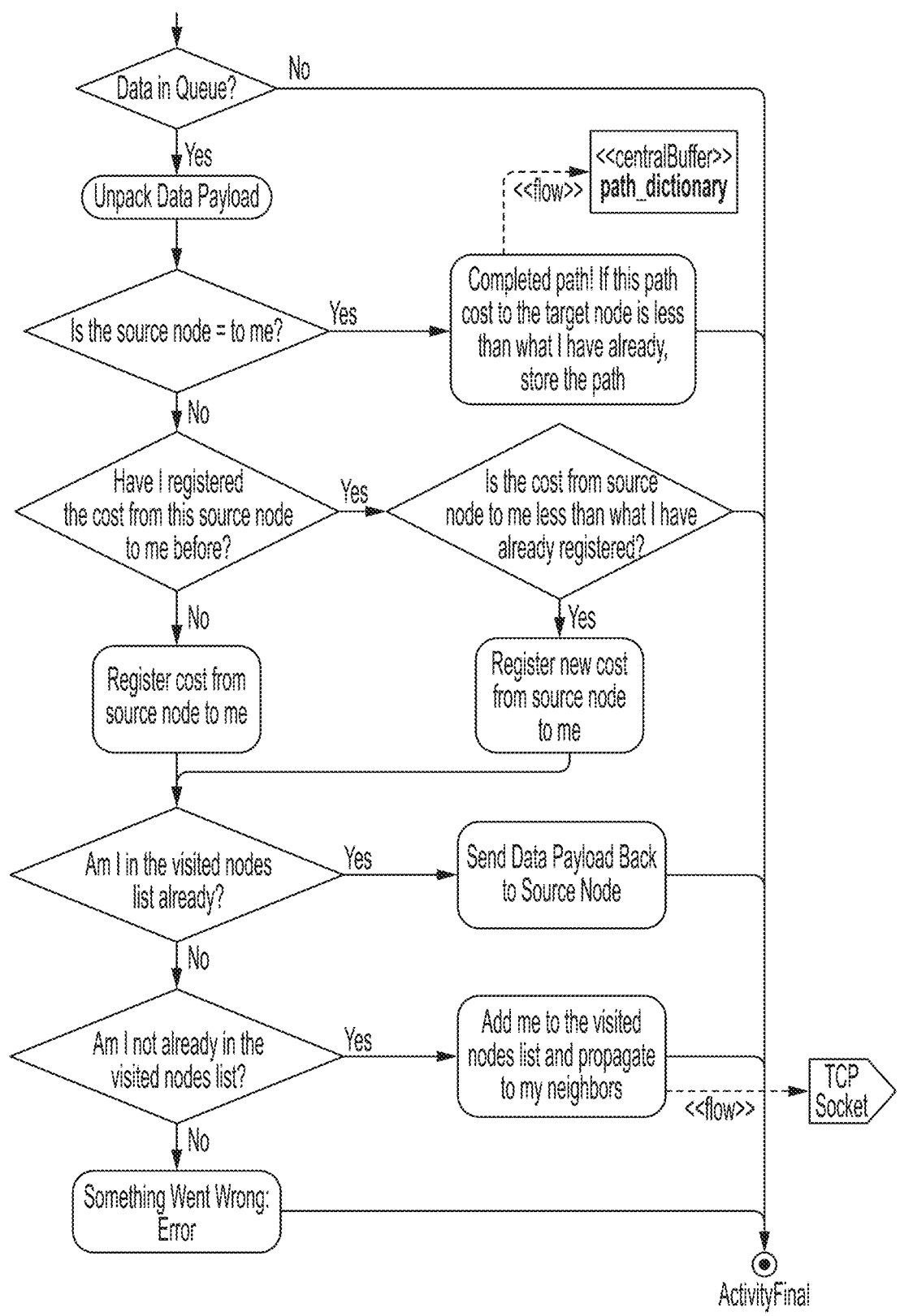
FIG. 12 is a flow diagram of an example of swarming for path analysis.

An example of swarming is shown in FIG. 12. When a PathAnalysisMgr receives a broadcasted data payload, it can mean that some other node has placed the node id into the target field of the payload and broadcasted it out. The transport system has steered the payload to the node. Now the node will perform 4 simple rules. These are explained as follows:

Determine if the source_node_id==node. When a node determines that the path from the source to it has been completed, either because it finds itself already in the path list, or it has no nodes to propagate to (leaf node), it will copy the payload's source id to the target id and send the payload back to the source. If the node gets a payload with its id as the target AND the source, it means that it originally created the payload, the path has completed and was sent to it by another node, or it has looped back around to it. The visited_nodes_list is looked at to see the path cost (e.g., the number of hops for example) from the target node to it. If the path cost is less than what the node already has stored, then the path is stored in my path_dictionary with the target_node_id as the key and the process continues. This payload will not be propagated so break from the loop.

If source_node_id !=the node. Determine that some other node is the source of this payload. Determine when the node has registered the cost from the source_node_id to the node before. If so, is this cost less than what the node already has registered? If yes, register this new cost keyed by the source_node_id and continue. If no, then no matter how this payload propagates, it will not have the least cost, so do nothing, killing the payload, and break from the loop. If the node has not registered the cost from the source_node_id yet, then register it and continue.

Determine whether the node is in the visited_nodes_list already. If so, then this path is complete. Copy the source id into the target id of the payload, send this payload back to the originating source_node_id and break from the loop.

Determine if the node is not in the visited_nodes_list. If so, add the node to the visited_nodes_list and propagate the data payload to neighbors just like in the PathAnalysisMgr Seed operation described above and continue.

Following these simple rules allows the cluster to process the least-cost path analysis of all nodes to all nodes in a distributed fashion with an $O(E+\log(N^2))$ and near-linear growth with regards to topology size. The swarm will accelerate quickly until the nodes begin killing the data payloads. In other words, the swarm will converge quickly upon a set of solutions that represent the lowest cost path from all nodes to all nodes, and then drain quickly with the losing paths being killed by the nodes.

Figure 13:
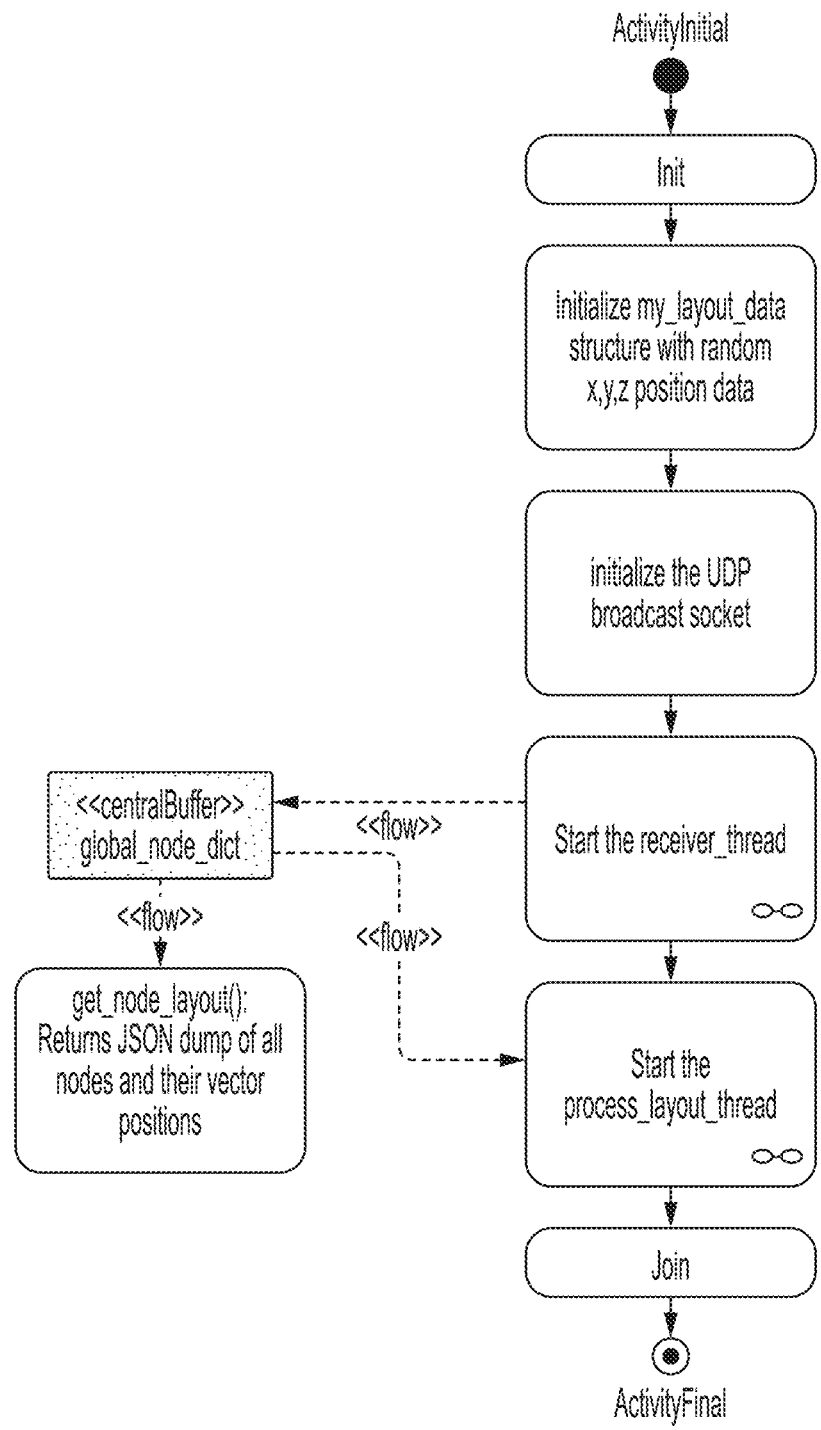
FIG. 13 is a flow diagram of an exemplary layout manager software class.

An example of the LayoutMgr is shown in FIG. 13. According to some embodiments, only one of these is instantiated by a NodeMgr if the cluster is to analyze the topology's visual layout. The LayoutMgr uses UDP for communication with other nodes. It will begin the receiver_thread to begin listening for any UDP data. This payload is: class LayoutData: node_id=−1 position=[0.0, 0.0, 0.0] mass=1.0 velocity=[0.0, 0.0, 0.0] acceleration=[0.0, 0.0, 0.0] speed=0.0 energy=0.0.

It is a node's positional data keyed by its node_id. For initialization, this node's positional data is set to a small random position and broadcasted out to the rest of the nodes. This allows all nodes to begin building their dictionaries with the graphical positions of the other nodes.

When a LayoutMgr receives a LayoutData payload, as broadcasted from other nodes, it will store it in its global_node_dict keyed by the node's id in the payload. This dictionary will accumulate all of the nodes' positional data from the topology, but not interconnecting data. The LayoutMgr's process_layout_thread will then use its global_node_dict, make a comprehensive copy, and calculate the Fruchterman-Reingold force layout to result in this node's new position. This node's new position is then broadcasted via UDP back out for all of the other nodes and the process continues.

Figure 14:
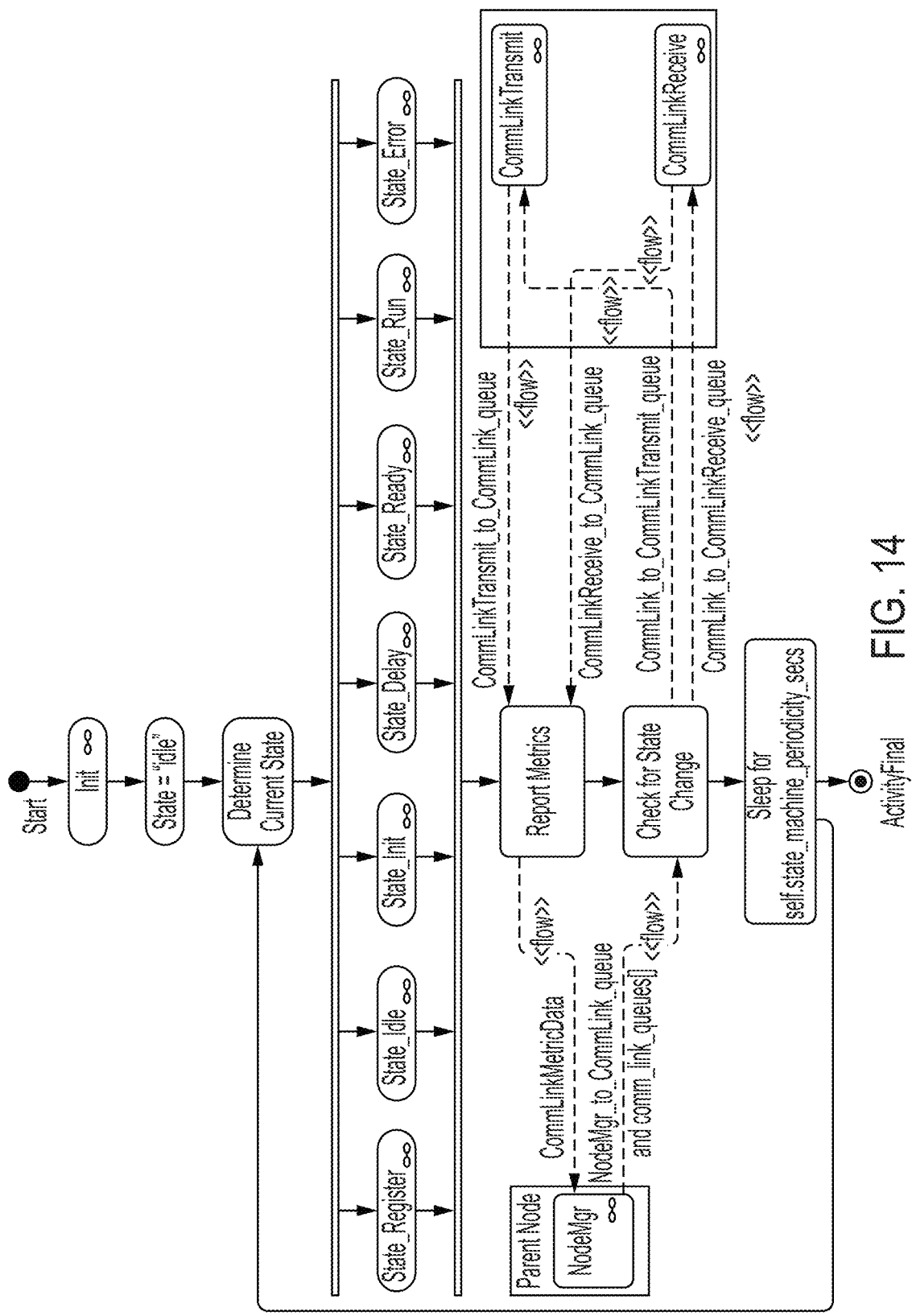
FIG. 14 is a flow diagram of an exemplary communication link thread processing.

The Aggregated Throughput Analysis may use the CommLinkThread software class. An example of the CommLinkThread processing is shown in FIG. 14. N number of these CommLinkThreads may be instantiated by the NodeMgr depending upon the number of ingress/egress links that the NodeMgr has. A CommLinkThread will either instantiate a single CommLinkReceive class or a single CommLinkTransmit class or both. Both would be instantiated in an undirected or bidirectional link. The CommLinkThread will go to the init state and instantiate the necessary CommLinkReceive/CommLinkTransmit classes and initialize them as well. These classes merely set up thread-safe TCP socket connections between this node and a target node ip/port. CommLinkReceive will first setup a listener on the socket. A short time later the CommLinkTransmit will activate and attempt to connect to its target node IP/host. Both classes are re-entrant and handle errors by clearing their sockets, reverting to their internal init state, and re-initializing. This allows for the injection of impairments without hanging the threads. Each thread may report its TX/RX accumulative bytes to the NodeMgr, which will then aggregate them across all its CommLinkThreads and report the totals up to the RtbMgr. The RtbMgr will update the node table in the database with the updated totals.

Transport Layer

The ability of the RTB emulator to determine paths from all nodes to all nodes within a network topology and the incorporation of a configurable data flow architecture in the RTB emulator can be utilized to create a transport layer that emulates a simple Time Domain Multi-Access (TDMA) transport. With this transport, impairments such as jamming and cyber effects and be emulated through the use of custom data structures traversing the network topology from nodes to nodes via channels (also referred to herein as links), carrying frames that contain timeslots that themselves carry synthesized payloads. These payloads contain ever-growing log data that represents all of the impairments that the payload has encountered throughout its travels from a source node to a target node across the network topology.

This transport layer, as implemented in the RTB emulator, may ride above an Open Systems Interconnection model (OSI) network stack and does not attempt to replicate standard routing protocols such as the Routing Information Protocol (RIP), the Open Shortest Path First (OSPF), or Multiprotocol Label Switching (MPLS) that uses tag-based techniques based upon link state from one node to the next. Each payload contains a pre-determined and static routing table from which routing information is derived via each defined node in this table, and sent to the appropriate outgoing channel.

The packing of payloads into a particular timeslot of a frame enables emulation of channel capacity, since there are finite number of timeslots contained within a frame. This can be configured a priori. Each frame is then transmitted between nodes via a channel at a pre-determined frame rate, which emulates latency.

Payloads can have priorities. These priorities may play an important role in determining which payloads will be loaded into timeslots of outgoing frames. When a channel is impaired, capacity constrained, or the frame has high latency, the payloads with higher priorities will be routed differently based upon a network resiliency algorithm applied.

Finally, as each payload is transmitted from node to node over a channel, it will log any impairments, along with their metadata, that the payload encounters. When the payload reaches its target, these logs can be forensically analyzed by a network resiliency algorithm.

In this fashion, the network operation is analyzed holistically by spraying payloads from source nodes to target nodes and analyzing their metadata within the network resiliency algorithm.

Frame Data Structure

Figure 15:
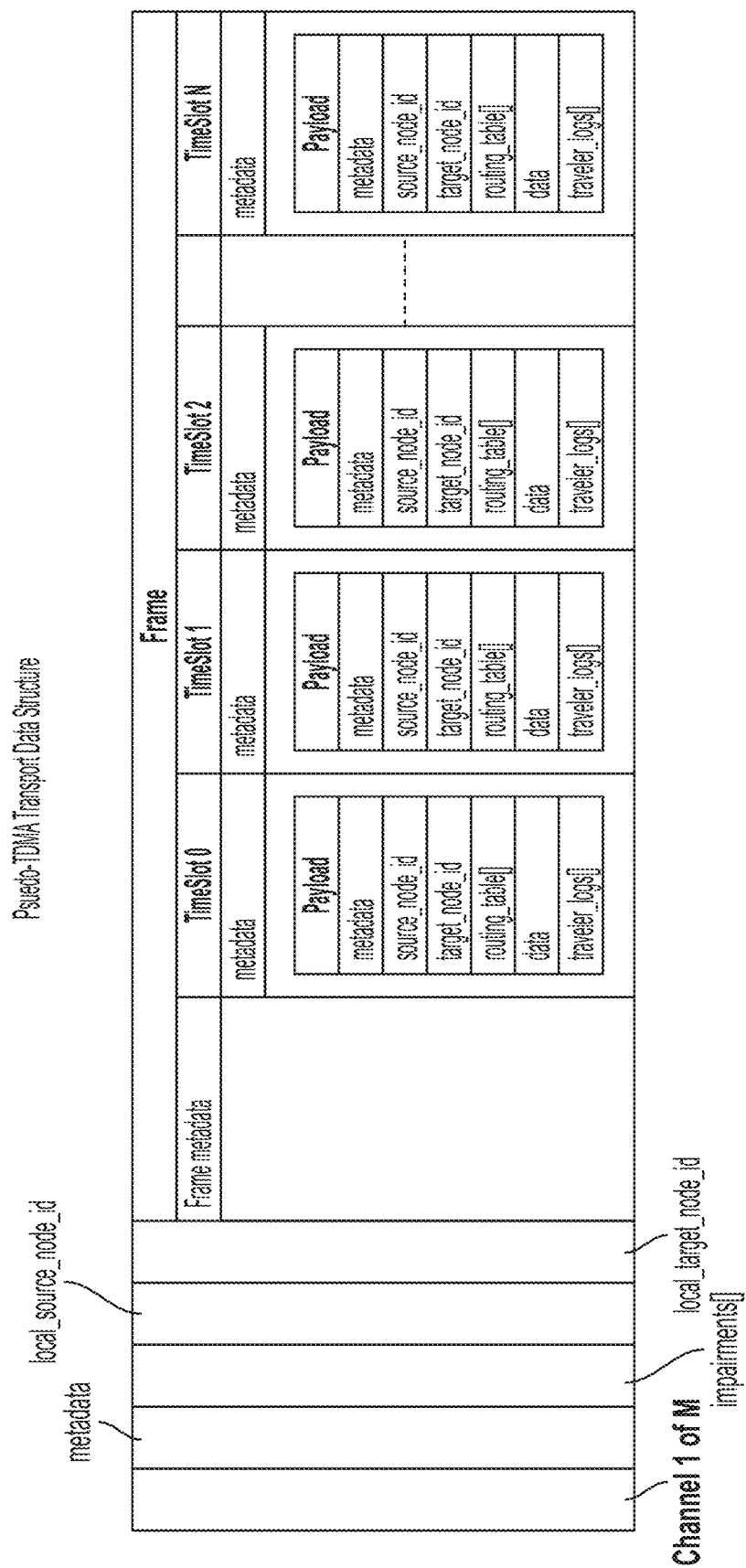
FIG. 15 illustrates an example of a pseudo-TDMA data structure.

The frame data structure that may be utilized in a transport layer can resemble a standard TDMA data structure. An example of a suitable pseudo-TDMA data structure is illustrated in FIG. 15. Each channel (e.g., communications links 418 of FIG. 4) connecting a local source node to a local target node will transmit continuous frames at a fixed rate. Each channel will contain metadata specific to that channel such as Channel ID, local source node ID, local target node ID, timestamp, and any impairments that the channel is currently experiencing such as jamming, cyber effects, SNR degradation, etc.

Each Frame contains metadata specific to that frame such as Frame ID, sequence ID, total number of timeslots, and all of the parent channel metadata. Each Frame will contain N number of TimeSlots where N is fixed and is configured during the initialization of the topology on the RTBE.

Each TimeSlot will contain metadata data specific to that timeslot such as TimeSlot ID, creation timestamp, and all of the parent Frame metadata. Each TimeSlot will contain exactly 1 Payload. There will be N Payloads per Frame.

Each Payload will contain metadata specific to that payload such as Payload ID, Source Node ID, Target Node ID, Creation timestamp, Delivered Timestamp, Priority, pre-loaded Routing Table, Sample Data, and all of the metadata from the parent TimeSlot. Each Payload will contain a growing Traveler log of impairments that the Payload has experienced as it traveled from its source node to it target node.

TravelerLogs are small log entries that contain the impairments as key/value pairs, or any other important metadata, that requires persistent within the payload for the analysis by the resiliency algorithms. These logs are continuously appended with dynamic data as the Payload moves through the topology.

Architecture

Figure 16:
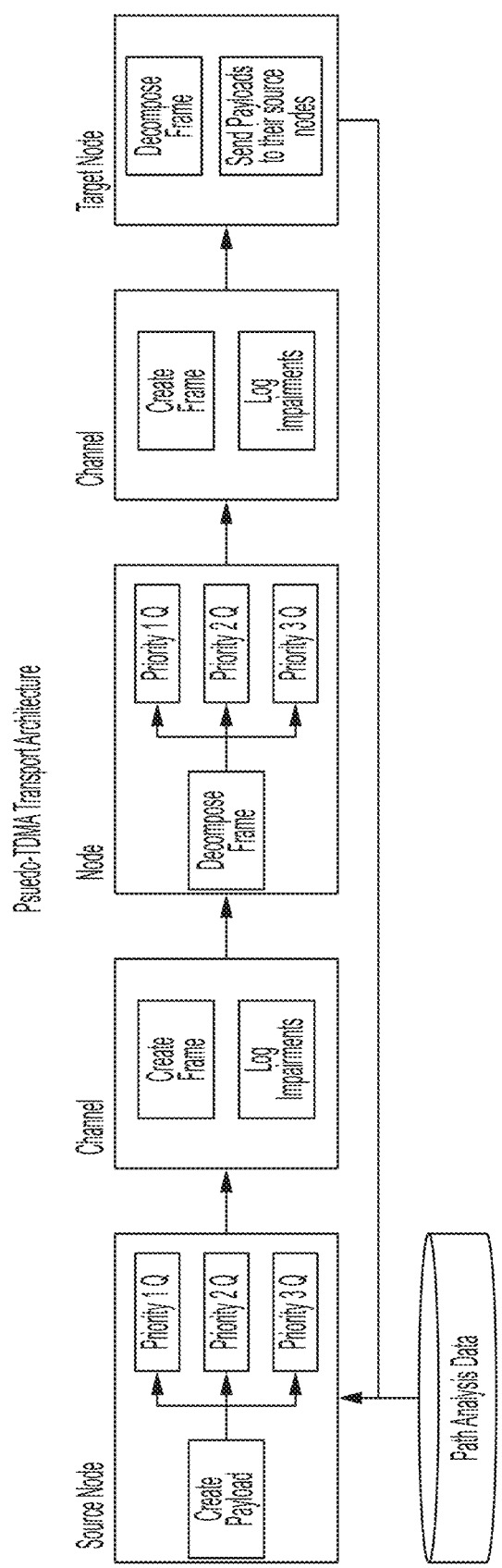
FIG. 16 is a diagram of an example of how a frame structure may be used within a TDMA transport layer.

FIG. 16 is a high-level diagram of how the frame structure may be used within the transport layer. The Source Node will create a payload that will have a given priority, sample data, and a pre-loaded routing table. Using this routing table, the payload will be processed by the appropriate out-going channel, which will then pack the payloads into a frame and transmit the frame to the next Node. The receiving Node will decompose the frame, and the payloads will be loaded into their queues for their specific priority. Again, the appropriate outgoing channel will process the payloads, pack them into frames, and transmit them to the next Node until finally the payloads reach their Target Nodes. The Target Nodes will decompose the incoming frames and send the payloads back to their originating Source Nodes for forensic analysis.

Figure 17:
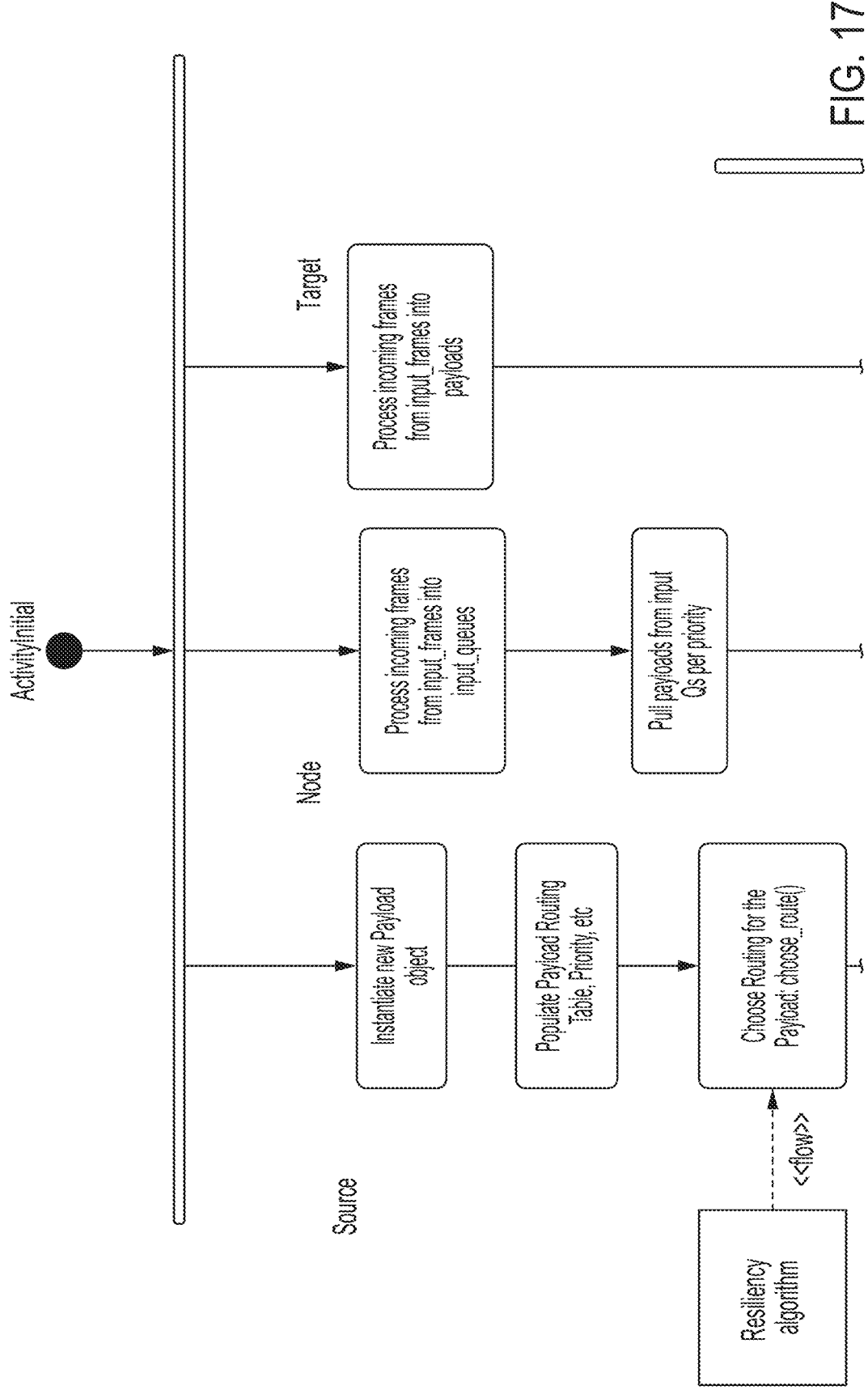
FIG. 17 illustrates an exemplary software architecture for a source node, a node, and a target node.
Figure 17:
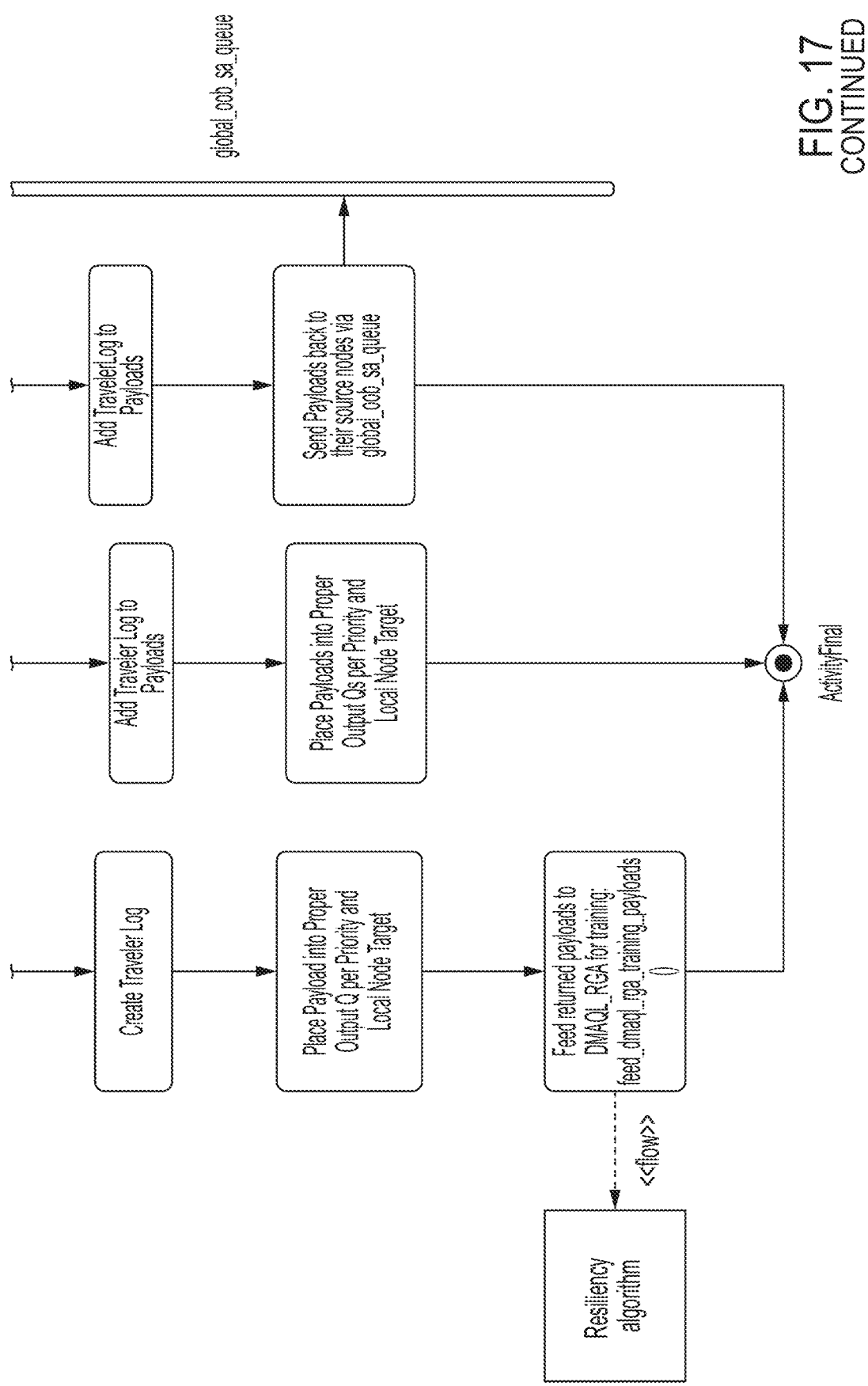

FIG. 17 represents the software architecture for Source Node, Node, and Target Node. Based upon the node's configuration, the node will execute one of the three vertical paths shown in FIG. 17.

Source Node

Each node can be configured to be a Source Node that is a separate software process executing in the RTB emulator. As a Source Node, the node will create a new Payload with sample or test data. It will also create a routing table that will include node IDs that the payload must traverse to arrive at its desired destination target node. Given a destination target node, the Source Node will query the Path Analysis Data, sorted by least cost, to determine possible routes to this target node. There could be, for example, thousands of routes. However, the path with the best characteristics may be chosen. The selected route data is loaded into the Payload's routing table.

Once the payload is generated, it will be placed upon one of three priority First-In-First-Out (FIFO) queues based upon the Payload's specific priority. At this point, the Source Node has completed its operation.

Payloads can be created on-demand, or at a specific sample rate. They can also contain any desired test data such as images, voice, video frames, etc.

Node

A Node acts as a simple gateway in its default operation where it is neither a Source nor a Target. It will receive incoming Frames from all Channels that transmit to it, decompose the frames into their Payloads, update the Payloads TravelerLogs, and then load the Node's FIFO priority queues with the received Payloads based upon the Payloads' specific priority. The FIFO priority queues are specific to the appropriate outgoing channel that will connect to the next node of the Payload's routing table.

Target Node

The Target Node operation is identical to a Node's operation with the exception that it is the last entry in the Payload's routing table. When this detection occurs, the Target Node will update the Payload's TravelerLogs that the Payload has terminated, and send the Payload, along with all of its TravelerLog data, back to the Payload's Source Node through an Out-Of-Band (OOB) connection, or through In-Band (TB) connection if desired.

Figure 19:
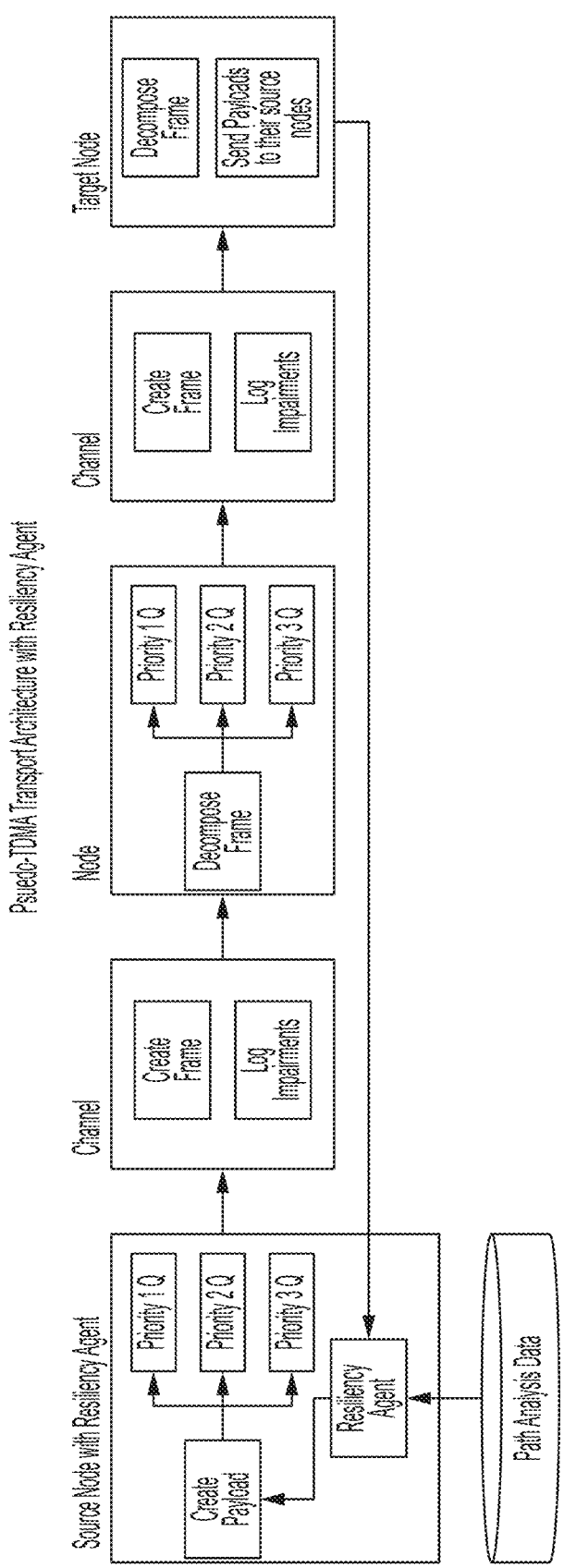
FIG. 19 illustrates an example of a pseudo-TDMA transport architecture integrating a resiliency agent.

Once the Source Node has received the processed Payload, it can either ignore it by sending it to ground or use the Payload's TravelerLog data to determine the state of the routing that this Payload experienced and make an intelligent decision on how it will route future Payloads that it creates, which can be performed by a network resiliency agent integrated into the Source Node (see FIG. 19). This analysis can be exposed to provide detailed and holistic metrics on the resiliency of the entire network topology. At this point, the Payload may be extinguished.

Channel

A Channel is a link (e.g., communications links 418 of FIG. 4) that connects a local source node to local target node and is responsible for generating and transmitting frames that adhere to the Pseudo-TDMA Transport Data Structure. Each Channel is a separate software process executing within the RTB emulator. Channels will access their local source nodes' priority queues and pull the payloads it requires to fill a frame that it will transmit to the Channel's local target node. Payloads are loaded into the frame's open timeslots until all of the timeslots of the frame are filled, or a timeout has occurred where the Frame will be transmitted regardless of all of timeslots are being filled.

Figure 18:
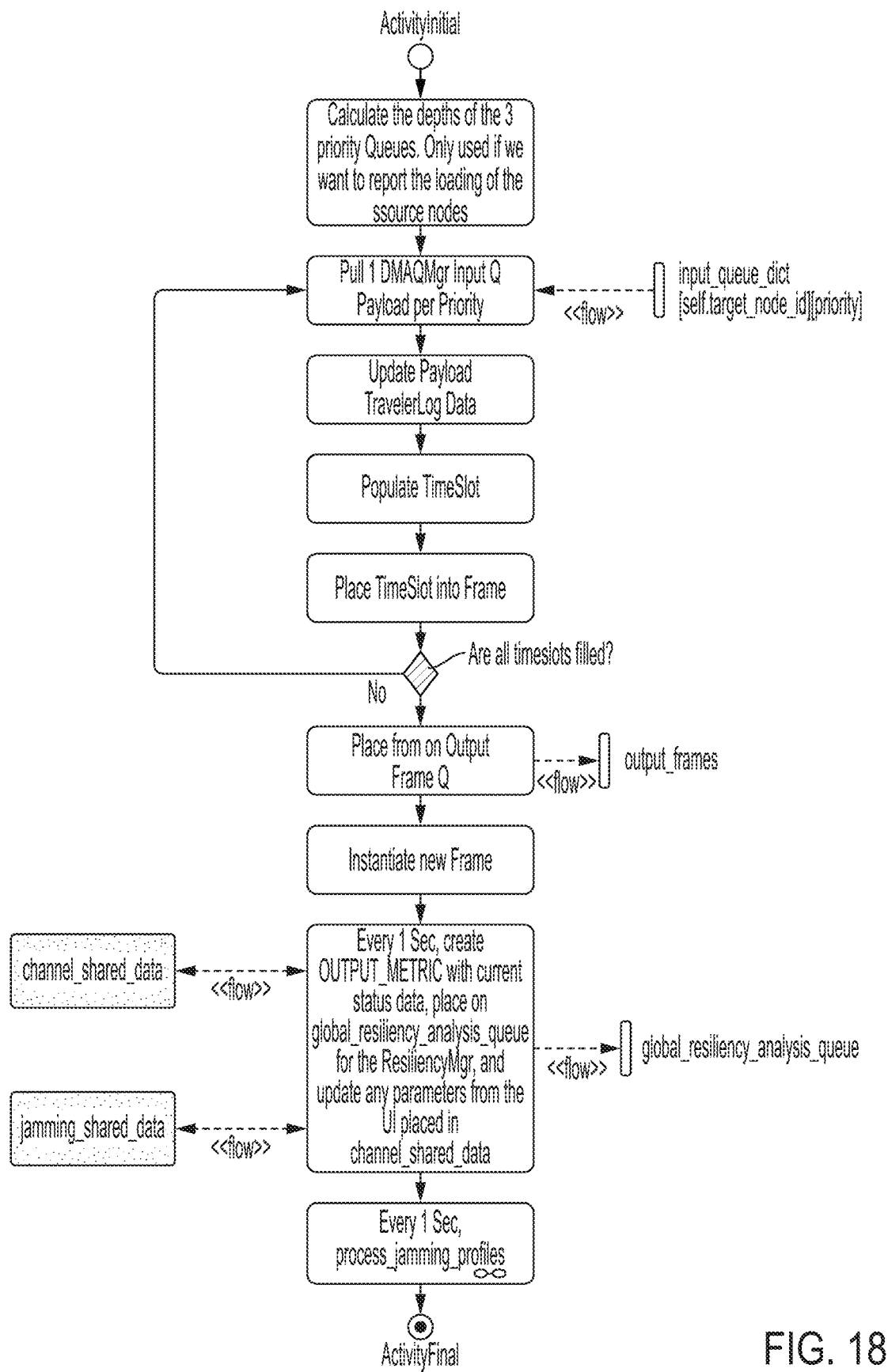
FIG. 18 illustrates an example of the software flow for channel processing.

Any impairment metadata such as jamming, SNR-degradation, etc., that the Channel is currently experiencing, along with any appropriate non-impairment metadata, will be propagated to the Frame, TimeSlot and Payload children. The Payloads will log these data as required in its Traveler Logs. At this point the Frame is ready to be transmitted to its local target node's frame buffer. FIG. 18 represents the software flow for Channel processing.

After the depths of the priority Queues are calculated, which represent the backlog loading of the transport layer, the Channel will pull a payload from its specific set of priority queues. For example, a set of 3 queues can be used where 1=Highest, 2=Moderate, and 3=Low priorities. Payloads are pulled from these queues based upon a weighting of, for example, 0.5, 0.25, 0.25 respectfully.

The Payload's TravelerLogs are updated and then the Payload is packed into an open TimeSlot. The TimeSlot is then placed into the Frame. Once the Frame is filled, or it times out, it is placed on its local target node's frame buffer (or Queue).

Metrics are computed and outputted every 1 Sec into a shared memory space for the Channel in the RTB emulator. Also, if jamming or impairments are enabled for this Channel, the processing involved for these impairments is executed according to the specific impairment profiles for this Channel.

Network Resiliency Agent

The pseudo-TDMA transport layer described above can enable the integration of a network resiliency agent that can use one or more network resiliency algorithms (e.g., stored in resiliency algorithm database 110 of FIG. 1A) to predict impairments in the entire network topology and modify the Payloads' routing tables such as to improve the network's resiliency. FIG. 19 illustrates an example of a pseudo-TDMA transport architecture integrating a resiliency agent. A Resiliency Agent is integrated into the Source Node. This Resiliency Agent can analyze the completed Payloads from their Target Nodes, learn from the impairments they have experienced traversing the topology, and modify the newly generated Payloads' routing tables to compensate and mitigate the topology's degraded nodes or channels. This Resiliency Agent can be any software process that can perform learning of the Payloads' TravelerLogs and modify the routing tables of generated Payloads.

An exemplary resiliency agent can utilize a Q-Learning technique that relates routes with their aggregated signal to noise ratio (SNR) computed along their routes. The Q-Learning-based resiliency agent can build a policy table (a Q Table) that provides probabilistic values for those routes that is constantly updated by the receipt of completed Payloads. Based upon these probabilistic values, it can recommend the least-cost path of newly generated Payloads based upon their desired Target Node.

In a training mode, the Q-Learning-based resiliency agent can randomly select routes for Payloads and analyze the resulting aggregated SNR incurred by the route chosen when the Payloads return. The Q-Learning-based resiliency agent can build a very large policy table based upon the details of the routes and the returned Payload TravelerLogs. Once training has been completed, the Q-Learning-based resiliency agent can revert from randomly selecting routes to determining the best route for a Payload given its Target node and the desired cost/reward parameters. The SNR is only one example of many network attributes that can be used to train the Q-Learning-based resiliency agent policy table. Other examples of network attributes include latency, capacity, priority, cost, etc.

Figure 20:
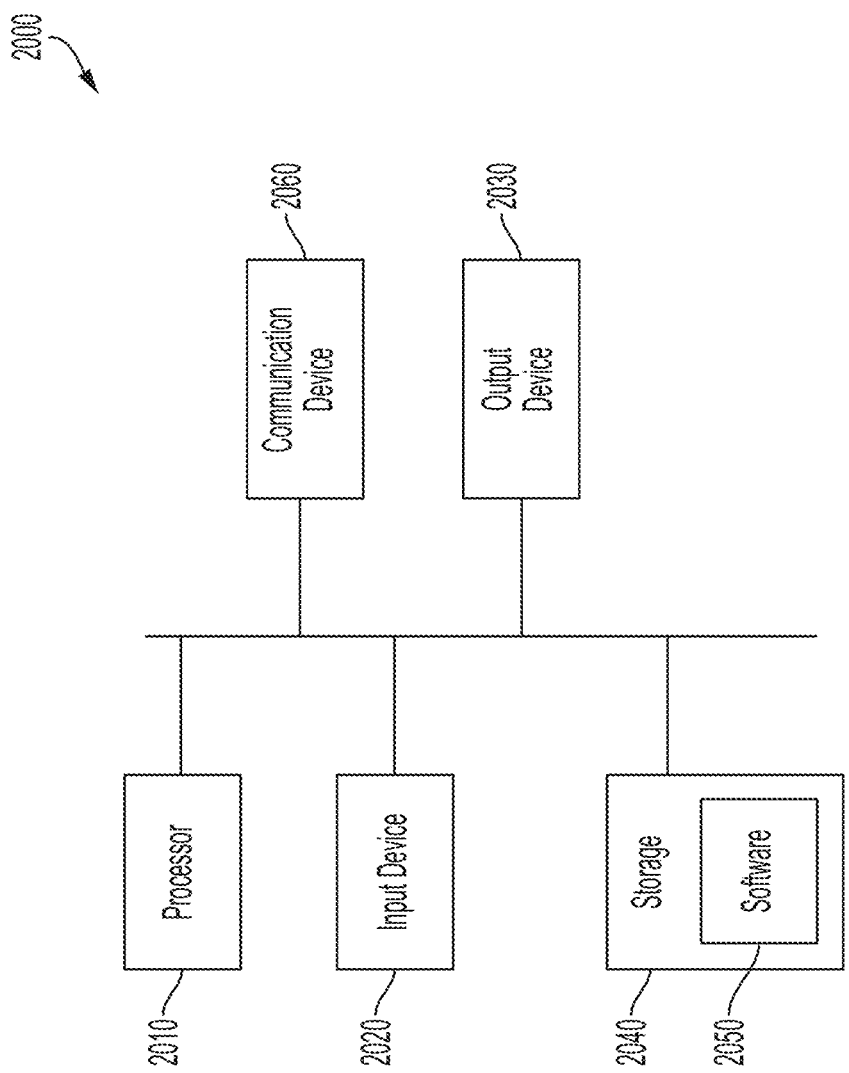
FIG. 20 is an exemplary computing system.

FIG. 20 illustrates an example of a computing system 2000, which can be used, for example, to implement any aspects of RTB emulator 104 of FIGS. 1A and 1B (including one or more instances of virtual machines), such as for performing one or more steps of method 200 of FIG. 2. System 2000 can be a computer connected to a network. System 2000 can be a client or a server. System 2000 can be any suitable type of processor-based system, such as a personal computer, workstation, server, handheld computing device (portable electronic device) such as a phone or tablet, or dedicated device. System 2000 can include, for example, one or more of input device 2020, output device 2030, one or more processors 2010, storage 2040, and communication device 2060. Input device 2020 and output device 2030 can generally correspond to those described above and can either be connectable or integrated with the computer.

Input device 2020 can be any suitable device that provides input, such as a touch screen, keyboard or keypad, mouse, gesture recognition component of a virtual/augmented reality system, or voice-recognition device. Output device 2030 can be or include any suitable device that provides output, such as a display, touch screen, haptics device, virtual/augmented reality display, or speaker.

Storage 2040 can be any suitable device that provides storage, such as an electrical, magnetic, or optical memory including a RAM, cache, hard drive, removable storage disk, or other non-transitory computer readable medium. Communication device 2060 can include any suitable device capable of transmitting and receiving signals over a network, such as a network interface chip or device. The components of the computing system 2000 can be connected in any suitable manner, such as via a physical bus or wirelessly.

Processor(s) 2010 can be any suitable processor or combination of processors, including any of, or any combination of, a central processing unit (CPU), field programmable gate array (FPGA), and application-specific integrated circuit (ASIC). Software 2050, which can be stored in storage 2040 and executed by one or more processors 2010, can include, for example, the programming that embodies the functionality or portions of the functionality of the present disclosure (e.g., as embodied in the devices as described above), such as programming for performing one or more steps of method 200 of FIG. 2.

Software 2050 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 2040, that can contain or store programming for use by or in connection with an instruction execution system, apparatus, or device.

Software 2050 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate, or transport programming for use by or in connection with an instruction execution system, apparatus, or device. The transport computer readable medium can include, but is not limited to, an electronic, magnetic, optical, electromagnetic, or infrared wired or wireless propagation medium.

System 2000 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

System 2000 can implement any operating system suitable for operating on the network. Software 2050 can be written in any suitable programming language, such as C, C++, Java, or Python. In various examples, application software embodying the functionality of the present disclosure can be deployed in different configurations, such as in a client/server arrangement or through a Web browser as a Web-based application or Web service, for example.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

The invention claimed is:

1. A method for network resiliency testing comprising:
executing a resiliency testbed application at a plurality of virtual machines;
accessing, by the plurality of virtual machines, network configuration data stored in a configuration database, the configuration data corresponding to a topology of a network to be emulated;
configuring at least a portion of the virtual machines, according to the network configuration data, to emulate a plurality of nodes of the network to be emulated;
automatically determining least cost paths between the plurality of nodes;
simulating communications between the plurality of nodes based on the determined least cost paths; and
determining one or more metrics of the network to be emulated based on the simulation.

2. The method of claim 1, wherein each node instantiates communications links to one or more other nodes for communicating information to the one or more other nodes.

3. The method of claim 1, wherein at least one of the nodes instantiates a path component for communicating to other path components of other nodes to analyze the least cost path across nodes.

4. The method of claim 1, wherein automatically determining least cost paths between the plurality of nodes comprises using swarm theory techniques to flood the emulated plurality of nodes with propagated data structures to analyze least cost paths from all nodes to all nodes.

5. The method of claim 1, wherein the nodes are configured to calculate a vector position for a visual layout and broadcast the vector position to other nodes so that the network topology can be visually displayed to a user.

6. The method of claim 1, wherein each virtual machine emulates a plurality of nodes.

7. The method of claim 1, comprising emulating at least 20,000 nodes.

8. The method of claim 1, wherein automatically determining least cost paths between the plurality of nodes comprises automatically discovering shortest paths between nodes by transmitting path analysis payloads between nodes.

9. The method of claim 8, wherein the payloads comprise a source node identification, a target node identification, and a list of nodes visited by the payload.

10. The method of claim 9, wherein the list of nodes visited by the payload is updated by at least one of the nodes receiving the payload.

11. The method of claim 9, wherein automatically determining least cost paths between the plurality of nodes comprises, at a respective node, determining that the target node identification identifies the respective node, updating the target node identification with the source node identification and send the payload back to the source node.

12. The method of claim 9, wherein automatically determining least cost paths between the plurality of nodes comprises, at the source node, determining that the source identification and the target identification identifies the source node, and determining whether a path traversed by the payload is a shortest path between the source node and the target node.

13. The method of claim 1, comprising displaying at least a portion of the metrics via a user interface to a user.

14. A computing system comprising one or more processors, memory, and one or more programs stored in the memory for execution by the one or more processors for causing the system to perform a method comprising:
executing a resiliency testbed application at a plurality of virtual machines;
accessing, by the plurality of virtual machines, network configuration data stored in a configuration database, the configuration data corresponding to a topology of a network to be emulated;
configuring at least a portion of the virtual machines, according to the network configuration data, to emulate a plurality of nodes of the network to be emulated;
automatically determining least cost paths between the plurality of nodes;
simulating communications between the plurality of nodes based on the determined least cost paths; and
determining one or more metrics of the network to be emulated based on the simulation.

15. The system of claim 14, wherein each node instantiates communications links to one or more other nodes for communicating information to the one or more other nodes.

16. The system of claim 14, wherein at least one of the nodes instantiates a path component for communicating to other path components of other nodes to analyze the least cost path across nodes.

17. The system of claim 14, wherein automatically determining least cost paths between the plurality of nodes comprises using swarm theory techniques to flood the emulated plurality of nodes with propagated data structures to analyze least cost paths from all nodes to all nodes.

18. The system of claim 14, wherein the nodes are configured to calculate a vector position for a visual layout and broadcast the vector position to other nodes so that the network topology can be visually displayed to a user.

19. The system of claim 14, wherein each virtual machine emulates a plurality of nodes.

20. The system of claim 14, comprising emulating at least 20,000 nodes.

21. The system of claim 14, wherein automatically determining least cost paths between the plurality of nodes comprises automatically discovering shortest paths between nodes by transmitting path analysis payloads between nodes.

22. The system of claim 21, wherein the payloads comprise a source node identification, a target node identification, and a list of nodes visited by the payload.

23. The system of claim 22, wherein the list of nodes visited by the payload is updated by at least one of the nodes receiving the payload.

24. The system of claim 22, wherein automatically determining least cost paths between the plurality of nodes comprises, at a respective node, determining that the target node identification identifies the respective node, updating the target node identification with the source node identification and send the payload back to the source node.

25. The system of claim 22, wherein automatically determining least cost paths between the plurality of nodes comprises, at the source node, determining that the source identification and the target identification identifies the source node, and determining whether a path traversed by the payload is a shortest path between the source node and the target node.

26. The system of claim 14, comprising displaying at least a portion of the metrics via a user interface to a user.

27. A non-transitory computer readable medium comprising instructions for execution by one or more processors of a computing system that when executing by the computing system cause the computing system to perform a method comprising:
- executing a resiliency testbed application at a plurality of virtual machines;
- accessing, by the plurality of virtual machines, network configuration data stored in a configuration database, the configuration data corresponding to a topology of a network to be emulated;
- configuring at least a portion of the virtual machines, according to the network configuration data, to emulate a plurality of nodes of the network to be emulated;
- automatically determining least cost paths between the plurality of nodes;
- simulating communications between the plurality of nodes based on the determined least cost paths; and
- determining one or more metrics of the network to be emulated based on the simulation.

* * * * *